United States Patent
Gateff et al.

(10) Patent No.: US 9,051,704 B2
(45) Date of Patent: Jun. 9, 2015

(54) COLD WATER PIPING SYSTEM INCLUDING AN ARTICULATING INTERFACE, MODULAR ELEMENTS, AND STRAINER ASSEMBLY

(71) Applicants: Jean-Paul Gateff, Hyeres (FR); Georges Mougin, Belaye (FR)

(72) Inventors: Jean-Paul Gateff, Hyeres (FR); Georges Mougin, Belaye (FR)

(*) Notice: Subject to any disclaimer, the term of this patent is extended or adjusted under 35 U.S.C. 154(b) by 0 days.

(21) Appl. No.: 14/445,522

(22) Filed: Jul. 29, 2014

(65) Prior Publication Data
US 2014/0356069 A1 Dec. 4, 2014

Related U.S. Application Data

(63) Continuation-in-part of application No. 13/166,179, filed on Jun. 22, 2011.

(60) Provisional application No. 61/357,691, filed on Jun. 23, 2010.

(51) Int. Cl.
| | |
|---|---|
| *E02B 15/04* | (2006.01) |
| *B63B 35/00* | (2006.01) |
| *B66D 1/60* | (2006.01) |
| *B01D 35/05* | (2006.01) |
| *E21B 43/01* | (2006.01) |

(Continued)

(52) U.S. Cl.
CPC ............... *E02B 15/04* (2013.01); *B63B 35/00* (2013.01); *B66D 1/60* (2013.01); *B01D 35/05* (2013.01); *E21B 43/0122* (2013.01); *C02F 2103/08* (2013.01); *Y02E 10/34* (2013.01); *B63C 7/006* (2013.01); *F03G 7/05* (2013.01); *E02B 2015/005* (2013.01)

(58) Field of Classification Search
CPC ............ E02B 2017/0039; E02B 2017/0095; E02B 9/00; E02D 27/52; E02D 29/06; B63B 35/44; B63B 35/003; B63B 2021/505; B63B 35/00; B63B 2035/448; B63B 22/00; E21B 17/01; E21B 17/015; E21B 19/004; E21B 41/08; E21B 17/08
USPC ........ 405/8, 9, 10, 195.1, 196, 200, 203, 205, 405/206, 223.1, 224, 224.1, 2, 224.3, 405/224.4; 60/641.7; 114/264
See application file for complete search history.

(56) References Cited

U.S. PATENT DOCUMENTS 1,847,551 A * 3/1932 Brayman et al. ............... 114/261
3,191,201 A * 6/1965 Richardson et al. ............ 441/3
(Continued)

*Primary Examiner* — Benjamin Fiorello
*Assistant Examiner* — Edwin Toledo-Duran
(74) *Attorney, Agent, or Firm* — Jones Day

(57) ABSTRACT

A cold water piping system including a floating platform having horizontal and vertical surfaces, the platform including a moon pool generally in the middle of the horizontal surface in the form of a vertical cylinder with four recesses having a rectangular shape, an articulating interface suspended directly from the platform, the interface including a tubular shape made of fabric and a bellows assembly disposed at a bottom portion thereof. The system also includes at least two suspension cable assemblies secured to the platform, where the at least two suspension cables cross the moon pool, vertically mounted modular elements, where ends of the suspension cable assemblies are fastened to a top modular element at four diametrically opposed points, and a strainer having sea water intakes including a counterweight connected to the lowest modular element. The system also includes winches disposed on the horizontal surface of the platform and deployment cables connected to the strainer and winches.

22 Claims, 26 Drawing Sheets

(51) Int. Cl.
  *B63C 7/00* (2006.01)
  *F03G 7/05* (2006.01)
  *C02F 103/08* (2006.01)
  *E02B 15/00* (2006.01)

(56) References Cited

U.S. PATENT DOCUMENTS

| | | | |
|---|---|---|---|
| 3,191,388 A * | 6/1965 | Ludwig | 405/197 |
| 3,279,404 A * | 10/1966 | Richardson | 114/293 |
| 3,500,841 A * | 3/1970 | Logan | 137/13 |
| 3,548,605 A * | 12/1970 | Armistead et al. | 405/60 |
| RE27,261 E * | 12/1971 | Bromell | 114/264 |
| 3,664,136 A * | 5/1972 | Laval et al. | 405/60 |
| 3,724,662 A * | 4/1973 | Ortiz | 405/65 |
| 3,745,773 A * | 7/1973 | Cunningham | 405/60 |
| 3,797,445 A * | 3/1974 | Zeimer | 114/312 |
| 3,856,272 A * | 12/1974 | Ravitts | 366/343 |
| 4,064,822 A * | 12/1977 | Thornburg | 114/230.12 |
| 4,116,009 A * | 9/1978 | Daubin | 114/264 |
| 4,160,464 A * | 7/1979 | Ballinger | 138/93 |
| 4,221,504 A * | 9/1980 | Person et al. | 405/168.4 |
| 4,245,475 A * | 1/1981 | Girden | 60/641.7 |
| 4,281,614 A * | 8/1981 | McNary et al. | 114/264 |
| 4,290,714 A * | 9/1981 | Strange | 405/60 |
| 4,298,295 A * | 11/1981 | Bozzo et al. | 405/52 |
| 4,350,014 A * | 9/1982 | Sanchez et al. | 60/641.7 |
| 4,355,513 A * | 10/1982 | Girden | 60/641.7 |
| 4,365,912 A * | 12/1982 | Burns | 405/60 |
| 4,395,157 A * | 7/1983 | Cunningham | 405/60 |
| 4,497,342 A * | 2/1985 | Wenzel et al. | 137/565.17 |
| 4,571,125 A * | 2/1986 | Oshima et al. | 405/224 |
| 4,889,447 A * | 12/1989 | Strange | 210/170.05 |
| 5,201,345 A * | 4/1993 | Meskanick et al. | 138/178 |
| 2010/0147530 A1* | 6/2010 | Adamek et al. | 166/367 |
| 2010/0275597 A1* | 11/2010 | Kuo | 60/641.7 |

* cited by examiner

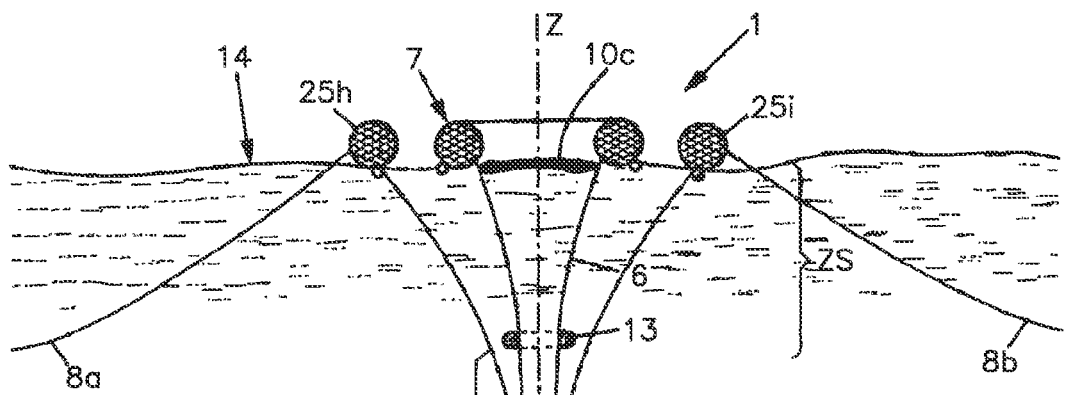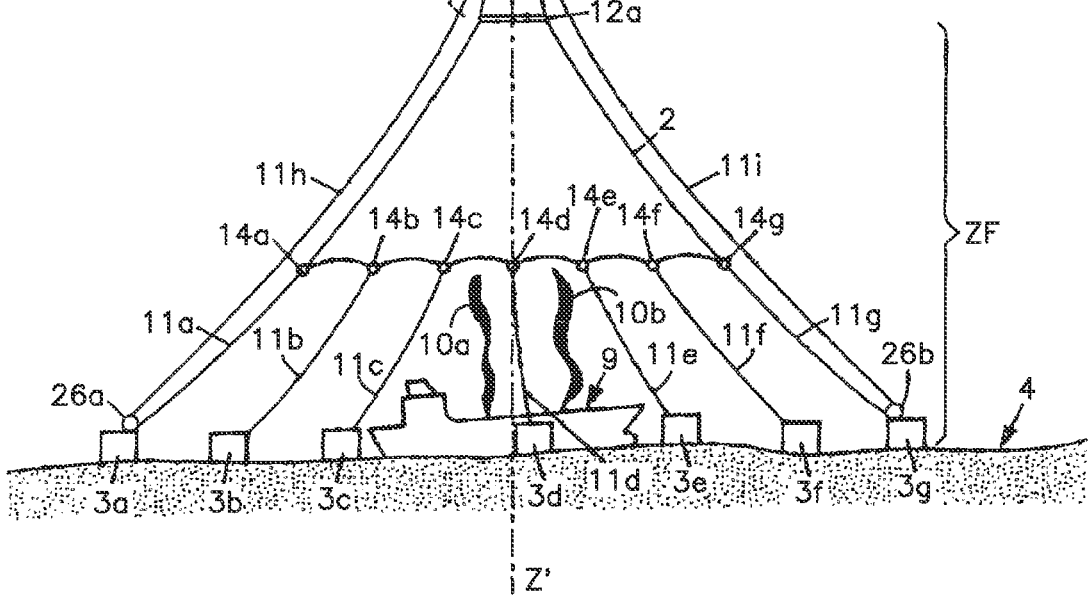
Fig.1

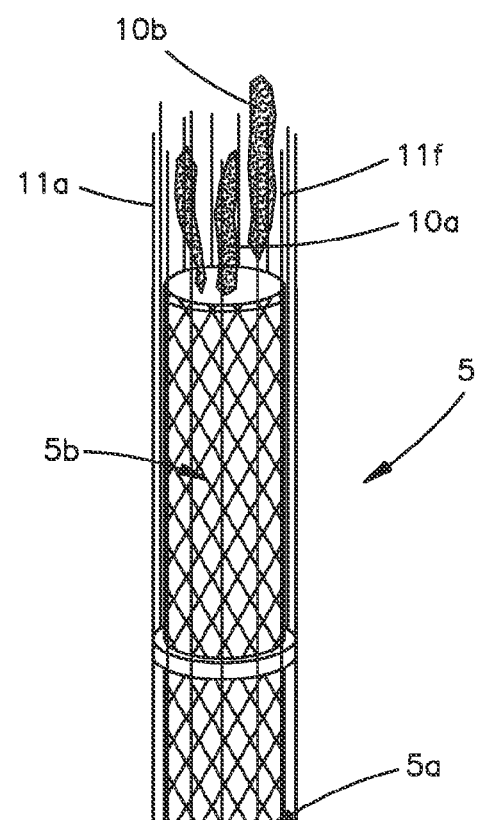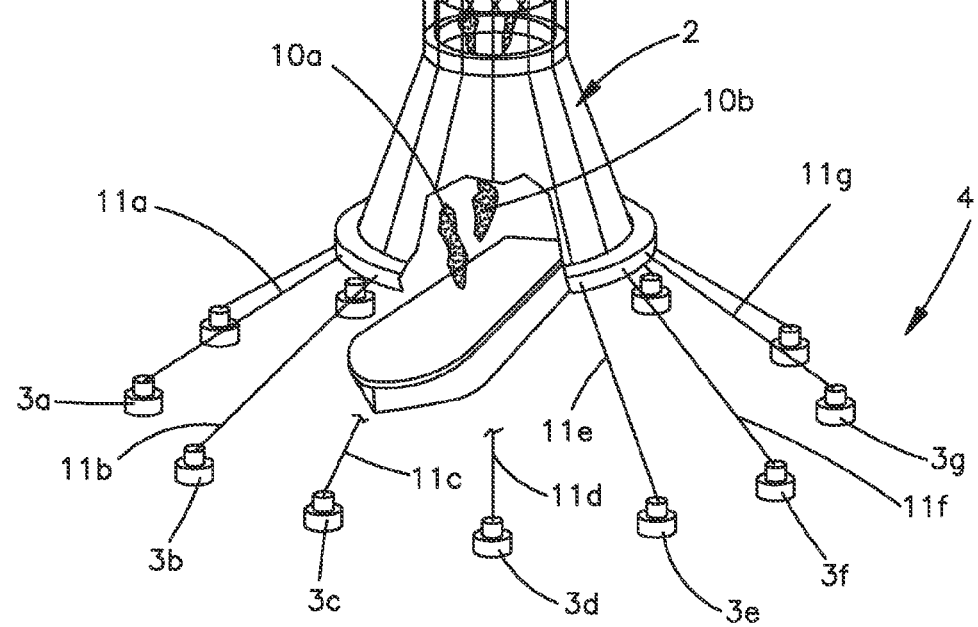
Fig.2

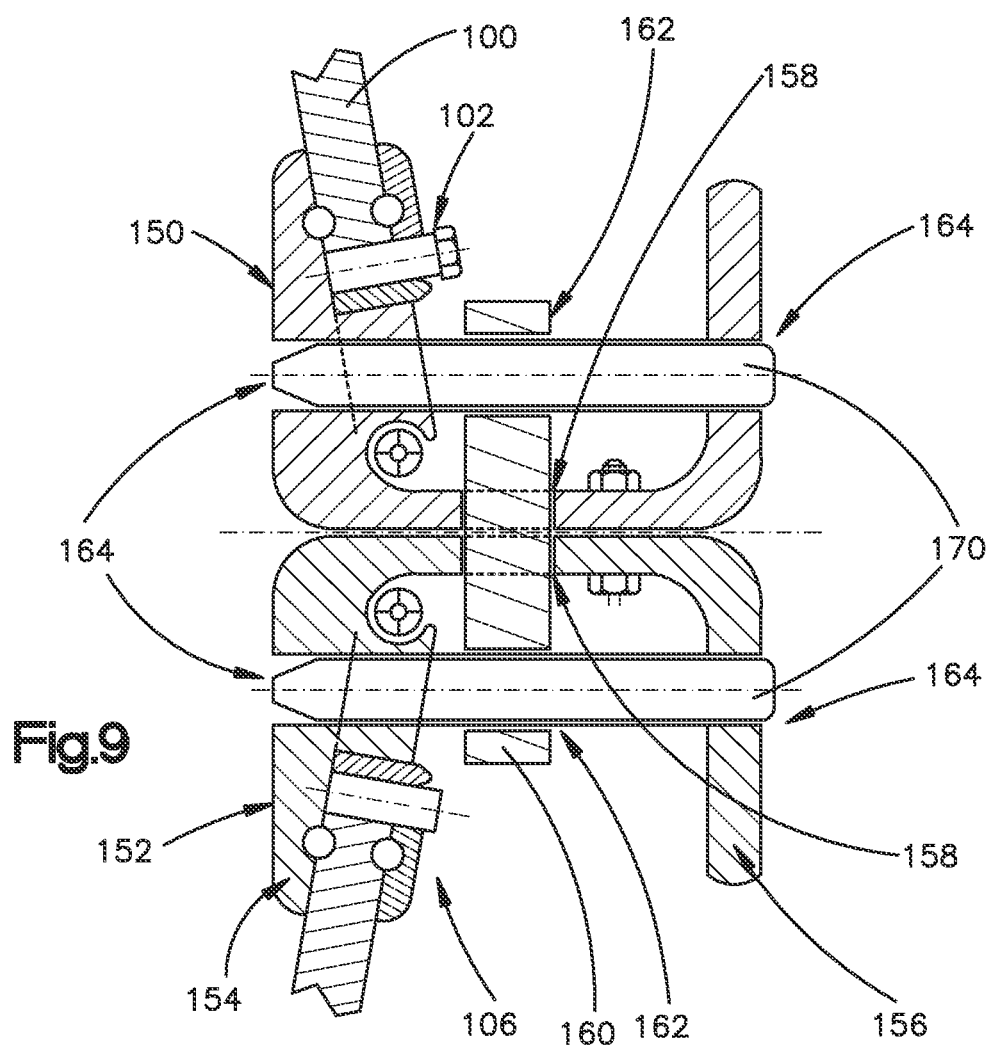
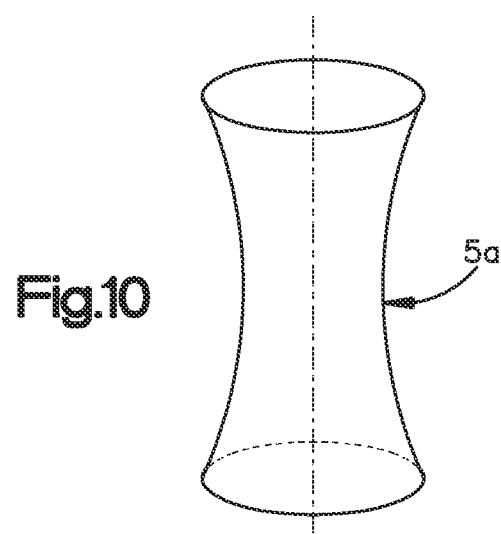

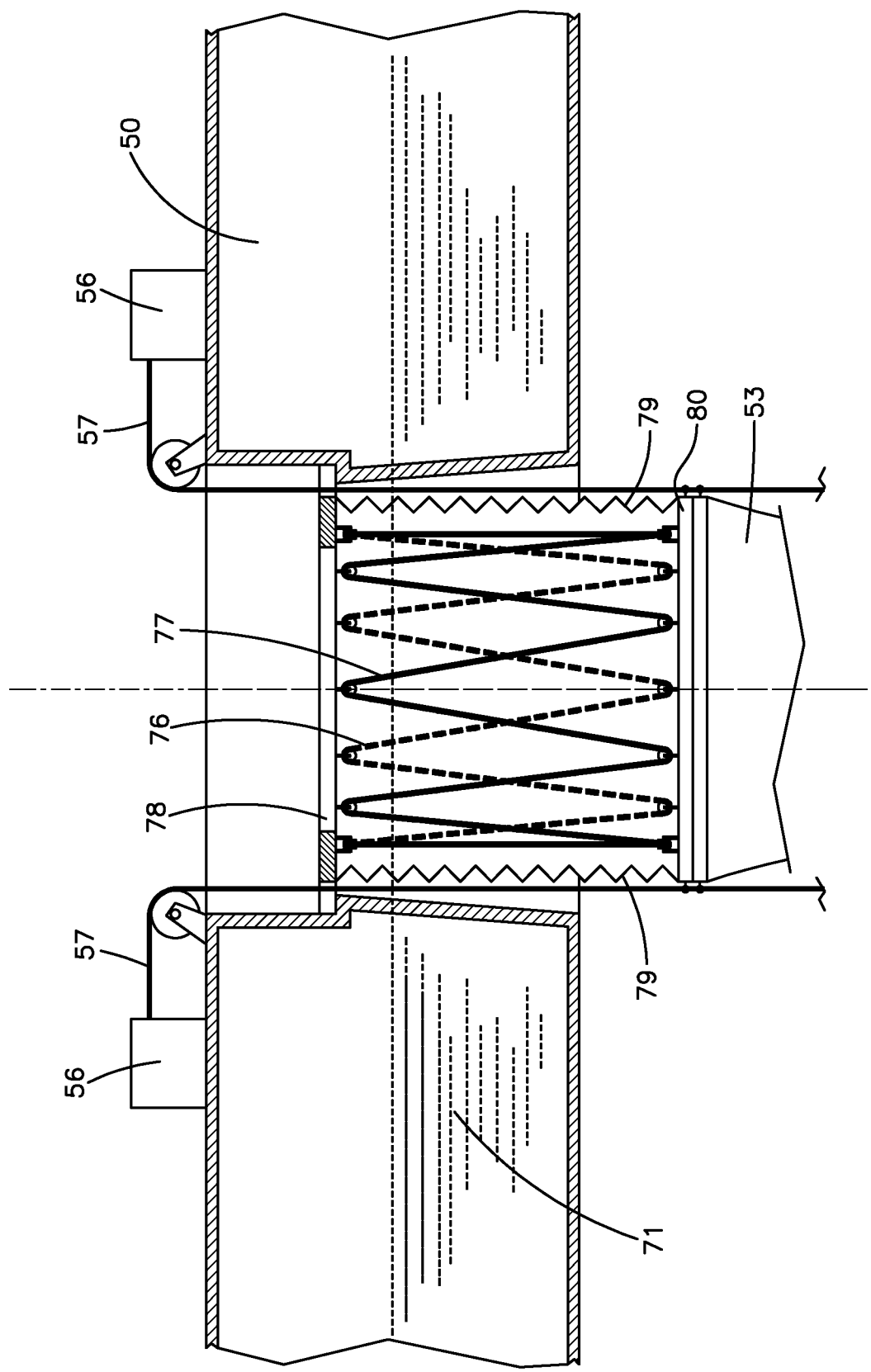

US 9,051,704 B2

COLD WATER PIPING SYSTEM INCLUDING AN ARTICULATING INTERFACE, MODULAR ELEMENTS, AND STRAINER ASSEMBLY

CROSS-REFERENCE TO RELATED APPLICATIONS

This application is a continuation-in-part of U.S. patent application Ser. No. 13/166,179, which was filed in the U.S. Patent and Trademark Office on Jun. 22, 2011. Application Ser. No. 13/166,179 claims the benefit of U.S. Provisional Application No. 61/357,691, which was filed in the U.S. Patent and Trademark Office on Jun. 23, 2010.

BACKGROUND OF THE INVENTION

1. Field of the Invention

Embodiments of the present invention relate generally to an apparatus for providing a column of water for collecting underwater fluids and contaminants. More particularly, embodiments of the present invention relate to a chimney-type apparatus that is used to collect fluids having a lower density than water, for example, oil from shipwrecks, sunken oil tankers, or underwater wells, or to collect large volumes of water, for example, cold seawater. Additionally, embodiments of the present invention relate to non vertical, large diameter underwater conduits that can be used to transport water and other fluids to the shore.

2. Description of the Related Art

Typically, the pumping and/or the recovery of a liquid product or viscous material, such as, for example, fuel or petroleum (oil), from the ocean floor at deep depths from a sunken oil tanker or from oil wells, is difficult if not impossible mainly because of depths ranging from 3000 to 4000 m and high hydrostatic pressures, for example, 400 bars. In addition, recovery efforts can be impeded by bad weather, which results in rough seas.

An example of a prior device for such recovery efforts includes International Application Publication No. WO 94/17251, which is directed to a device for collecting fluids from shipwrecks. The device described in this application, however, is limited by the depths at which it can be used.

Another example of a prior device includes French Patent No. 2 850 425, filed on Jan. 28, 2003 (the "French patent"), also published as International Application Publication No. WO 2004/070165 (the "International publication"), both of which are by the inventors named on the present application and which are directed to a device for recovering petroleum from a shipwreck. The entire contents of both the French patent and the International application are incorporated herein by reference in its entirety. The present application is directed to improvements on the French patent and the International application.

SUMMARY OF THE INVENTION

For the reasons included above, it is therefore an object of embodiments of the present invention to provide an apparatus for the collection of sub sea oil and seawater.

It is a further object of embodiments of the present invention to provide an apparatus that can deliver the large volumes of cold seawater required for Ocean Thermal Energy Conversion ("OTEC"), Floating Liquefied Natural Gas (FLNG), and other cooling processes.

Yet another object of embodiments of the present invention is to provide an apparatus that can provide an isolated column of seawater from the depths of the oceans to the oceans' surface.

A further object of embodiments of the present invention is to provide a modular, tubular structure or chimney-type apparatus that can be constructed on-site to provide a column of seawater from the depths of the oceans to the oceans' surface.

A still further object of embodiments of the present invention is to provide a modular, fabric or textile, tubular apparatus that can be constructed on-site to provide a column of seawater in order to act as a passageway for oil, cold seawater, and nutrients or other products carried by air lifted water such as metallic nodules located at depth in the oceans to the oceans' surface.

A further object of embodiments of the present invention is to provide an apparatus that can be used to shelter piping, risers and other equipment used in offshore drilling operations and/or to insulate such equipment from the surrounding cold seawater.

An object of the present invention is to provide a cold water piping system including a floating platform having horizontal and vertical surfaces, the platform including a moon pool generally in the middle of the horizontal surface in the form of a vertical cylinder with four recesses having a rectangular shape, an articulating interface suspended directly from the platform, the interface including a tubular shape made of fabric and a bellows assembly disposed at a bottom portion thereof. The system also includes at least two suspension cable assemblies secured to the platform, where the at least two suspension cables cross the moon pool, vertically mounted modular elements, where ends of the suspension cable assemblies are fastened to a top modular element at four diametrically opposed points, and a strainer having sea water intakes including a counterweight connected to the lowest modular element. The system also includes winches disposed on the horizontal surface of the platform and deployment cables connected to the strainer and winches.

Another object of the present invention is to provide a cold water piping system that includes a floating platform having horizontal and vertical surfaces, the platform including a moon pool generally in the middle of the horizontal surface in the form of a vertical cylinder with at least four recesses having a rectangular shape, an articulating interface suspended directly from the platform, the interface including a substantially circular tubular shape and a bellows disposed at a bottom portion thereof, and at least two suspension cable assemblies secured to the platform connected to the top of the interface, where the at least two suspension cables cross the moon pool. The system includes a plurality of vertically mounted modular elements, where ends of the suspension cable assemblies are fastened to a top modular element at four diametrically opposed points, a strainer having sea water intakes and ballasting means including a counterweight connected to the lowest modular element, a plurality of winches disposed on the horizontal surface of the platform, a plurality of deployment cables connected to the strainer and plurality of winches, and a plurality of suspension cables and roller bearings connected to the platform and bottom of the interface by connection means including a chain plate. In the system, with respect to the bellows connected to the first modular element, the bellows are made of a horizontally pleated cylinder, extended by a soft element in fabric, for continuity between the cold water pipe and the moon pool, the cylinder extension is fastened to the moon-pool near the platform by straps, the deployment cables being between the moon pool wall and the fabric element.

At least one other embodiment of the present invention includes a cold water piping system including a floating platform having horizontal and vertical surfaces, an articulating interface suspended directly from the platform, the interface including a substantially circular tubular shape, an apparel made of two rings spaced vertically a few meters apart, connected together by a continuous rope in a loop format, passing through pulleys on each ring, having a bellows arranged outside the apparel, the upper ring being secured with the platform, in the moon pool, where the lower ring is fastened to the top of the first modular element. The system includes at least two suspension cable assemblies connected to the top of the interface, where the interface is hung by four ends of the at least two suspension cables, a plurality of vertically mounted modular elements, where ends of the suspension cable assemblies are fastened to a top modular element, and a strainer having sea water intakes and ballasting means including a counterweight connected to the lowest modular element. In the system, a plurality of winches are disposed on the horizontal surface of the platform and a plurality of deployment cables are connected to the strainer and plurality of winches, where the lower ring is fastened to the top of the first modular element.

These and other objects and advantages are provided by the embodiments of the invention. In this regard, embodiments of the present invention are directed to a tubular apparatus having a large diameter. The apparatus provides a vertical column of water regardless of the depth in the ocean to the ocean's surface. Such an apparatus can be used in many applications, examples of which include:

- to insulate any oil piping, structures, and equipment located from cold seawater or to provide a means for circulating warmer water from the surface around the oil piping, structures, and equipment in order to heat the oil as it exits the well or other structures;
- to provide a means for delivering nutrient rich seawater to fish farms near the ocean surface;
- to provide a means for delivering minerals on the sea bed to the water surface;
- to deliver offshore or on shore the large volumes of cold seawater required in OTEC, FLNG and other cooling processes; and
- to transfer large volumes of soft water through a buoyant aqueduct within a body of water.

According to another embodiment of the present invention, instead of using an anchoring means to anchor the structure and provide tension, the structure may be directly hung from a floating body or platform with tension being provided by the structure's own weight and a ballast means at its bottom end. Thus, the bottom end of the tubular structure will be allowed to hang freely in the body of water preferably with a strainer connected at the bottom, where the strainer includes a weighted counterweight to provide additional tension.

For a better understanding of the embodiments of the present invention, its operating advantages and specific objects attained by its uses, reference is made to the accompanying descriptive matter in which preferred embodiments of the invention are illustrated in the accompanying drawings.

BRIEF DESCRIPTION OF THE DRAWINGS

Preferred features of the embodiments of the present invention are disclosed in the accompanying drawings, wherein similar reference characters denote similar elements throughout the several views, and wherein:

FIG. 1 is a schematic drawing of a tubular apparatus in operation, according to an embodiment of the present invention;

FIG. 2 is a depiction of a tubular apparatus in operation, according to an embodiment of the present invention;

FIG. 9 is a cross-sectional view along section line A-A in FIG. 8;

FIG. 10 is a schematic drawing of a modular element of the apparatus depicted in FIGS. 1 and 2, according to an embodiment of the present invention;

FIG. 19 shows a floating platform, articulating tubular interface, vertically mounted modular elements, and strainer used for water intake and ballasting for tensioning.

FIG. 24 shows a strainer assembly having a plurality of holes and containing a ballast in chains or other known in the art means for use as a counterweight.

FIG. 25 shows a more detailed view of the top portion of the floating platform, articulating tubular interface, vertically mounted modular elements, and winch and cable assemblies.

FIG. 26A shows a more detailed view of the top portion of the floating platform, articulating tubular interface, and cable assemblies; the winch and deployment cables shown in FIG. 25 have been removed to focus on the articulating aspect of the articulating tubular interface.

FIG. 26B shows a more detailed view of the top portion of the floating platform, articulating tubular interface, and cable assemblies during rough ocean weather causing the platform and related features to shift upward or downward; like FIG. 26A, the winch and deployment cables shown in FIG. 25 have been removed to focus on the articulating aspect of the articulating tubular interface.

FIG. 27A shows a cold water piping system according to an embodiment of the present invention, where FIG. 27A shows another embodiment of an articulating interface used in floating platform associated with OTEC and FLNG. More specifically, the articulating interface that supports the cold water piping system is hung by four ends of two suspension cables. FIG. 27A depicts a platform and another articulating interface during calm seas.

DESCRIPTION

Figure 2A:
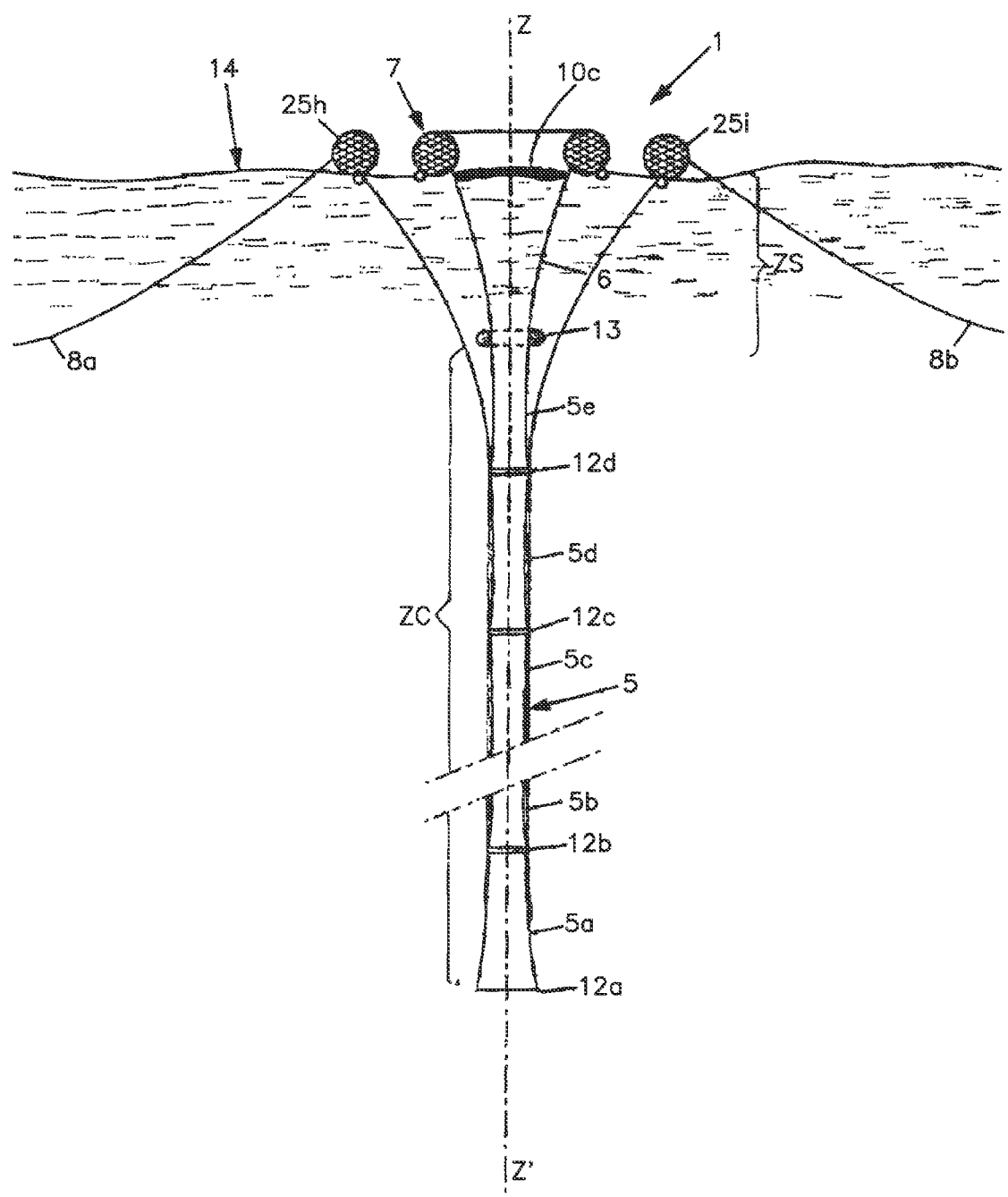
FIG. 2A is a schematic drawing of a tubular apparatus in operation, according to an embodiment of the present invention.

Embodiments of the present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete and will fully convey the scope of the invention to those skilled in the art.

In the following description, like reference characters designate like or corresponding parts throughout the FIGS. Additionally, in the following description, it is understood that terms such as "top," "bottom," "upper," "lower," and the like, are words of convenience and are not to be construed as limiting terms.

Typically, oil or petroleum exploration by way of offshore oil rigs is performed using metal piping. The metal pipes are connected to each other using fittings such that a plurality of pipes can be connected together to form a continuous passageway from the well on the ocean floor to an oil rig at the surface for the extraction of the oil. However, because the joined metal pipes form a rigid structure, the pipes undergo numerous vibrations as a result of high currents or rough seas acting on the pipes. These high vibrations result in the pipes undergoing significant mechanical stresses, which may result in damage to the pipes, thereby allowing oil to leak from the pipes. In addition, at depths beneath the thermocline, the temperature of seawater is low. Lower temperatures result in the viscosity of oil at these depth being higher, which makes extraction and recovery of oil more difficult and problematic. Because of these issues associated with deep water drilling and extraction, oil exploration and recovery typically does not exceed a depth of 3,000 m, however, with embodiments of the present invention, deeper oil exploration and recovery is possible. For example, embodiments of the present invention (1) can be used to deliver warmer water from the surface down to the oil wells on the ocean floor or (2) can be used to provide an insulated structure to protect against the colder seawater.

Further, with offshore drilling, there is always the possibility of a blow-out or explosion at the well located on the ocean floor. Currently, there is no one standard device that can be used to recover leaking oil as a result of a blow-out or an explosion because the circumstances surrounding a blow-out or explosion are unique, i.e., the depth of the blow-out or explosion, the position and condition of the pipes extending from the well, etc. Moreover, with a blow out, a gas such as methane usually leaks from the well with the leaking oil. This is problematic because the high pressures and low temperatures that are present on the ocean floor, results in the methane gas crystallizing, which typically causes an obstruction or blockage in any apparatus that is used to recover the leaking oil.

In addition, oil recovery from sunken oil tankers is also difficult and problematic because the circumstances surrounding a sunken ship are also unique, i.e., the depth of the sunken ship, the position of the sunken ship, the number of leaks and the location of the leaking oil, the ocean conditions in the area of the sunken ship, etc.

Moreover, Ocean Thermal Energy Conversion ("OTEC"), which uses the temperature differences between the ocean's colder deep water and the warmer surface water as a renewable energy source to produce commercial power, and seawater-based air conditioning ("SWAC"), which uses cold seawater located near coastlines as an air conditioner coolant, both require large volumes of seawater. For OTEC, the volume of cold water that must be supplied from the oceans' depths is very large, on the order of 150 $m^3/s$ (for a 50 MW power plant) or 3 $m^3/s$ per MW (megawatt). Such a volume of seawater requires a pipe having a cross-sectional area of 150 $m^2$, which equates to a pipe having a diameter of over 14 m (approximately 45 ft.). With current technology, it is difficult, if not impossible, to design and construct a metal pipe having such a diameter.

Thus, a need exists for an apparatus that can be used for (1) deep water oil recovery either as a result normal drilling operations or from a blow-out or explosion, (2) oil recovery from sunken oil tankers, and/or (3) that can be used to deliver the large volumes of cold water necessary for OTEC and SWAC. Additional applications for the embodiments of the present invention include, and are not limited to, bringing minerals located on the ocean floor or sea bed to the surface and use in fish farms or the like. Fish farms require nutrient-rich water. Thus, the present apparatus can be used to bring the deeper, nutrient-rich water, to the surface where the fish farms are located. Embodiments of the present invention are directed to addressing these needs and can be used in various bodies of water such as, for example, oceans, lakes, etc.

Embodiments of the present invention are directed to a modular flexible tubular apparatus/structure that can be deployed anywhere in the world's oceans or other bodies of water in order to recover oil or other fluids or to provide the large volumes of cold water necessary for OTEC and SWAC operations or any process that utilizes the temperature difference between a body of water's warmer surface water and its colder water at depth as a renewable energy source. The modular flexible tubular apparatus/structure can be constructed from, for example, fabric or textile membranes. Essentially, embodiments of the present invention provide a vertical column of water from a body of water's floor to its surface. This vertical column of water is shielded from the surrounding currents and water conditions and therefore, provides a column of calm water. This column of calm water can be used to provide shelter for other structures such as oil piping risers. Advantageously, because the tubular apparatus can be used to provide a vertical column of seawater, recovery of oil from deep within the oceans, can be performed without the need for pumping equipment. This is possible because oil is less dense than seawater and, as a result, is more buoyant than seawater. Consequently, oil that enters the tubular apparatus rises up the column of seawater to the surface as a result of its natural buoyancy. Further, because the tubular apparatus is made of modular elements, the tubular apparatus is very versatile and can be used for various applications at various depths. Thus, a single tubular apparatus can be used multiple times for multiple applications. Moreover, the tubular apparatus's modular construction allows the separate components that comprise the chimney apparatus to be manufactured simultaneously by multiple suppliers, which reduces the manufacturing time and costs.

As depicted in FIGS. 1 and 2, in one embodiment, the tubular apparatus 1 includes a base 2 at the ocean floor 4 that is used as an inlet for oil, 10a, 10b, leaking from a sunken oil tanker or well 9 or for seawater, a means 6 for collecting or storing the oil or other recovered fluids near the ocean surface, and a plurality of cylindrical modular elements, 5a, 5b, 5c, 5d, 5e, that extend between and connect the base 2 to the collecting means 6 thereby forming a continuous vertical columnar passageway 5 from the base 2 to the collecting means 6 for the recovered oil or other fluids to flow. As discussed above, because oil is less dense than the seawater contained within the tubular apparatus 1, oil collected in the passageway or column of water formed by the base 2, collecting means 6 and the plurality of modular elements 5a, 5b, 5c, 5d, 5e, rises to the surface due to its natural buoyancy in seawater and does not require any pumping means. As depicted in FIG. 2A, in another embodiment of the present invention, the tubular apparatus can be constructed without a base 2.

The base 2 can be any shape necessary to achieve its desired function but as shown in FIGS. 1 and 2, the base is typically conically- or funnel-shaped. Because of its shape and size, the base 2 can be used to recover leaking oil from a sunken ship over an area ranging from 4,000 to 6,000 m². The diameter of the base can range from 40 to 120 m and is attached to the ocean floor 4 by way of vertical lines, 11a, 11b, 11c, 11d, 11e, 11f, 11g, which may be cables or synthetic ropes and which extend from and attach to the base 2 by way of attaching rings, 14a, 14b, 14c, 14d, 14e, 14f, 14g, and which attach to anchoring blocks, 3a, 3b, 3c, 3d, 3e, 3f, 3g, that are positioned on the ocean floor 4 around the area where the collection of oil and other fluids is to be performed.

As can be seen in FIG. 1, anchoring blocks 3a and 3g include sheaves or similar structures 26a and 26b. As will be apparent to those skilled in the art, additional anchoring blocks and sheaves may be used if necessary. As can also be seen in FIG. 1, cables 11h and 11i pass through the sheaves 26a and 26b, pass through structures such as donuts or shackles on the connecting rings, 12a, 12b, 12c, 12d (discussed below), and attach to winches, capstans or hydraulic jacks included on floating barges or platforms 25h and 25i, which can also be anchored to anchoring blocks on the ocean floor 4 by anchoring lines 8a and 8b. In order to provide vertical tension on the chimney apparatus 1, cables 11h and 11i are pulled in or tightened using the winches, capstans or hydraulic jacks on barges 25h and 25i, thereby vertically tensioning the chimney apparatus 1. In addition or alternatively, vertical tensioning may be performed or aided by a ballasting 13 and/or by a floating means 7 included at the water surface. When lowered into position, the bottom of the base 2 can be located, for example, approximately 40 to 60 m above the ocean floor.

As will be apparent to those skilled in the art, additional anchoring means may be used to anchor the base 2. For example, metal baskets can be lowered from the surface to the ocean floor in a similar manner to the anchoring blocks. The baskets can also include sheaves similar to the anchoring blocks in order to receive the cables (see cables 11h and 11i). Once in position, ordinary anchor chain can be lowered into these metal baskets, thus forming the anchoring means. Accordingly, this type of anchoring means can be constructed quickly and easily transported to the deployment site and the weight can be tailored based on the desired application by the amount of anchor chain that is lowered into the metal baskets. Further, for more permanent operations, instead of anchoring blocks or baskets, moorings can be constructed into the ocean floor.

At or near the water surface is included a surface structure or a means 6 for collecting or storing the recovered oil or other fluids. As depicted in FIG. 1, the collecting means 6 can just be an area on the water surface surrounded by the floating means 7, which contains the recovered oil or fluid 10c within its boundaries. Periodically, the recovered oil or fluid 10c can be pumped into storage vessels or recovery tankers.

Figure 3:
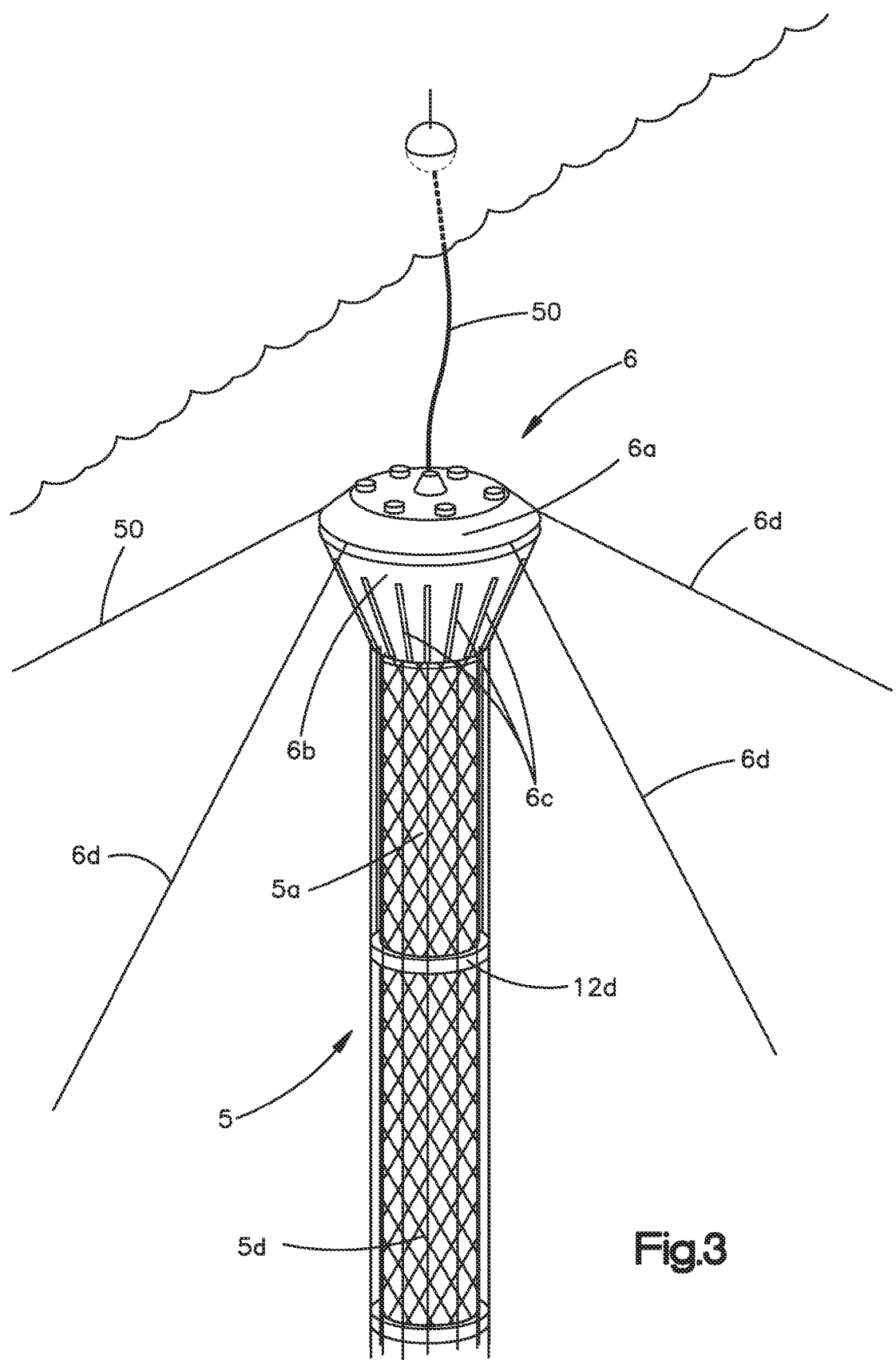
FIG. 3 is a depiction of a collecting means, according to an embodiment of the present invention.
Figure 4:
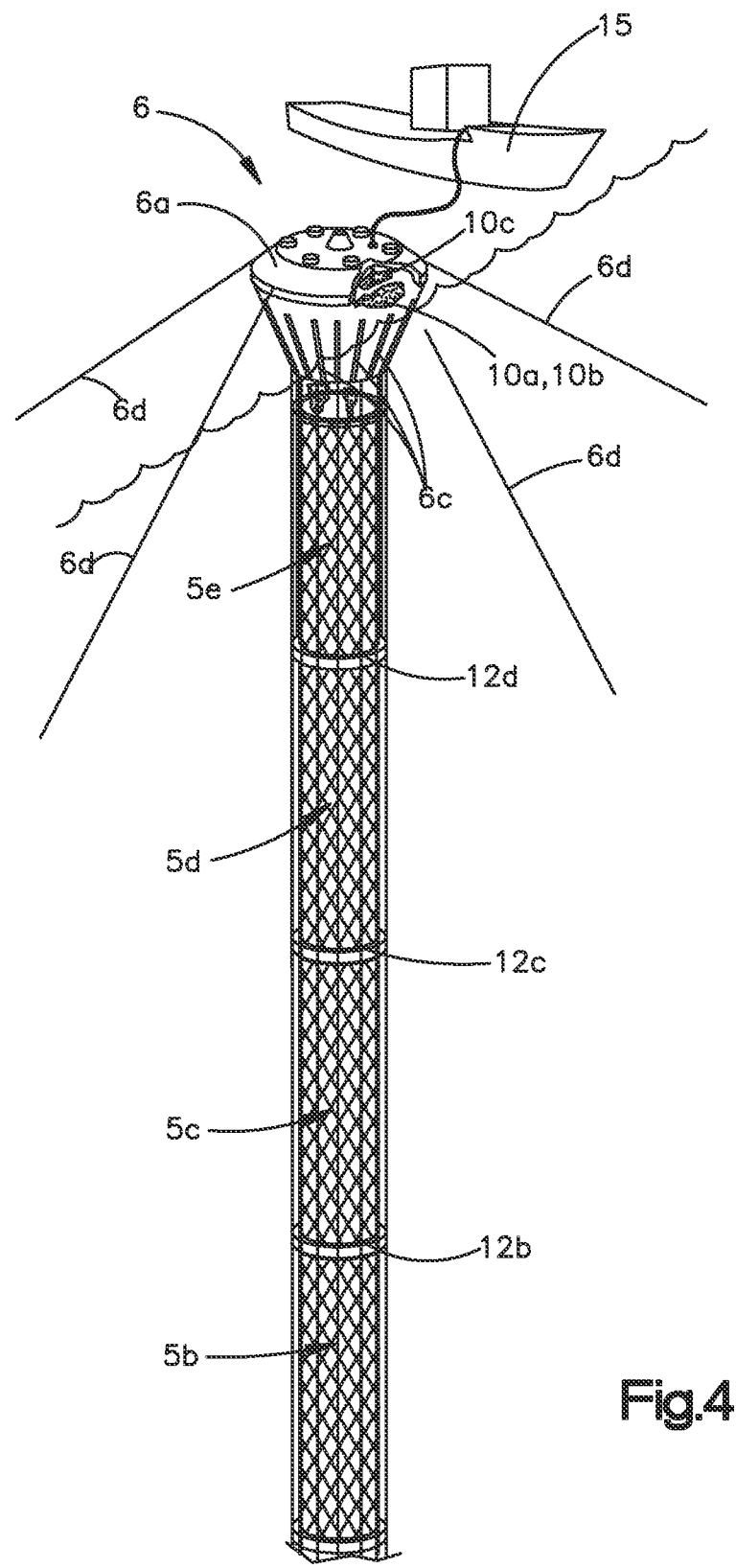
FIG. 4 is another depiction of a collecting means, according to an embodiment of the present invention.

As depicted in FIGS. 3 and 4, the means 6 for collecting the oil or other fluids can also be, for example, a surface storage vessel including, for example, a toroidal-shaped float 6a with a central watertight steel chamber of approximately 20 to 30 m in diameter and a fabric skirt 6b of approximately 80 m in height that is tensioned by ballasts 6c hung around its lower edge. The diameter and height of the means 6 for collecting the oil or other fluid is optimized to provide a holding capacity of approximately 150,000 barrels to accommodate sudden outbursts of oil and to provide a buffer during pumping of the recovered oil from the collecting means 6. The collecting means 6 can also include tensioning devices such as winches, capstans and/or hydraulic jacks that attach to cables 6d, which attach to additional anchoring blocks on the ocean floor 4. These tensioning devices, can be used to adjust the vertical position or depth of the collecting means 6 with respect to the water surface. Thus, the collecting means 6 can be submerged below the water surface (FIG. 3) to avoid damage and unnecessary stresses and strains on the modular elements as a result of waves, swells or bad weather. The collecting means 6 can also be positioned on the surface (FIG. 4) in order to allow removal of the recovered oil or fluid. Moreover, the collecting means 6 can include an extraction pipe or hose 50 that can be extended when submerged so that extraction of recovered oil or fluids can be performed while submerged. As will be apparent to those skilled in the art, the collecting means 6 can have any shape and can be designed to either satisfy differing functions or to perform in different sea conditions.

One embodiment of the collecting means 6, operates as follows. Oil that enters the base 2 of the chimney apparatus 1 rises to the surface as a result of its natural buoyancy in seawater. At the surface, the collecting means 6 contains the oil within its boundaries. Because the oil is less dense than the seawater, the oil forms a layer on top of the sweater at the surface. The more oil, the deeper the layer of oil. The layer of oil can then be siphoned off the water surface and pumped into a recovery tanker or vessel.

As can be seen in FIGS. 1 and 2 and as discussed above, connecting the base 2 to the collecting means 6 are a plurality of cylindrical modular elements, 5*a*, 5*b*, 5*c*, 5*d*, 5*e*. Typically, each modular element, 5*a*, 5*b*, 5*c*, 5*d*, 5*e*, is approximately 10 to 50 m in height and can range from 3 to 15 m in diameter. The membrane that forms each modular element, 5*a*, 5*b*, 5*c*, 5*d*, 5*e*, is made from several vertical panels that are joined together along their edges or along their vertical or sloped edges to form the cylindrical structure of the modular element (discussed below). Included at the top and bottom of each modular element, 5*a*, 5*b*, 5*c*, 5*d*, 5*e*, are connection rings, 12*a*, 12*b*, 12*c*, 12*d*, which are used to connect adjacent modular elements together or to connect a modular element 5*a* to the base 2 or a modular element 5*e* to the collecting means 6. In addition to being used to connect the components of the chimney apparatus 1 to each other, the connection rings provide radial tensioning of the modular elements in order to maintain the cylindrical shape of the modular elements and the chimney apparatus 1. Attaching the base 2 to the connection ring 12*a* of modular element 5*a*, stabilizes the bottom of the vertical column 5.

The connecting rings, 12*a*, 12*b*, 12*c*, 12*d*, are designed to withstand radial tension or compression and can be made from different materials depending on the intended use of the chimney apparatus 1 and/or the duration of submersion. Examples of these materials include metals such as steel, aluminum and/or other metals and alloys, laminated woods that can advantageously be used for their natural buoyancy, reinforced composite materials that include preforms woven from glass, ceramics, carbon, aramid, polyethylene, etc. and embedded in a matrix material such as an epoxy resin.

Figure 5:
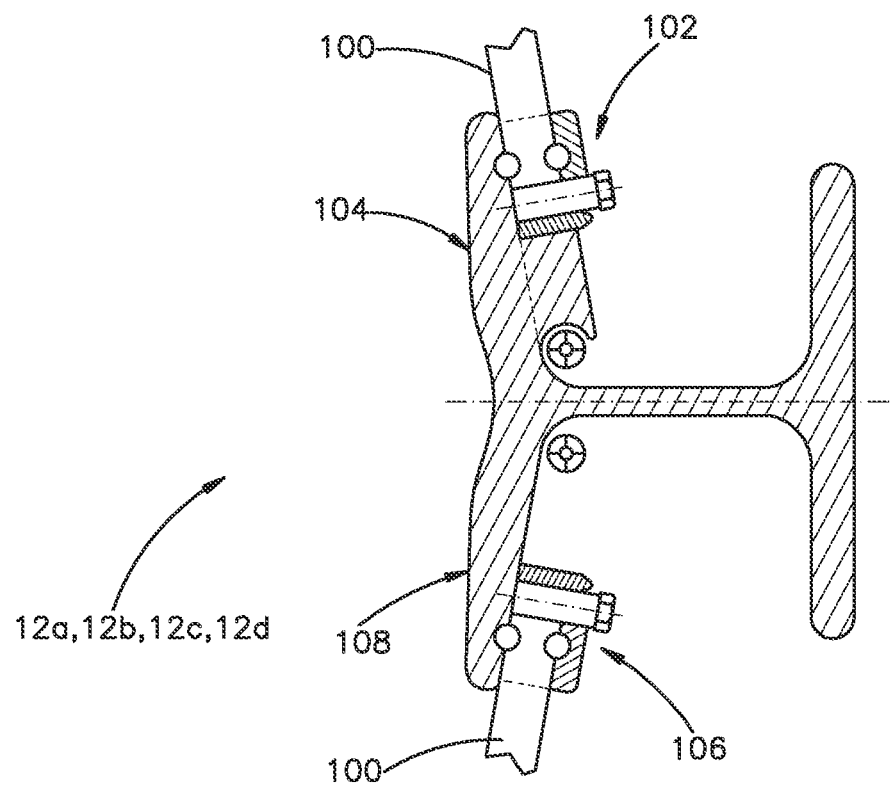
FIG. 5 is a cross-sectional view of a connecting ring attached to the fabric membrane of adjacent modular elements, according to an embodiment of the present invention.

As previously disclosed, the modular elements, 5*a*, 5*b*, 5*c*, 5*d*, 5*e*, that form the tubular apparatus 1, are joined together using a plurality of connecting rings, 12*a*, 12*b*, 12*c*, 12*d*. As depicted in FIG. 5, the fabric membrane 100 that forms the modular elements, 5*a*, 5*b*, 5*c*, 5*d*, 5*e*, attaches to the connecting rings, 12*a*, 12*b*, 12*c*, 12*d*, by, for example, bolting, clamping, or lashing the fabric membrane 100 to the connecting rings, 12*a*, 12*b*, 12*c*, 12*d*. As will be readily apparent to those skilled in the art, additional means for attaching the fabric membrane 100 to the connecting rings, 12*a*, 12*b*, 12*c*, 12*d*, may be used. As also depicted in FIG. 5, in one embodiment, the connecting rings, 12*a*, 12*b*, 12*c*, 12*d*, can be a one-piece structure where the bottom end 102 of one modular element attaches to a top portion 104 of a connecting ring, 12*a*, 12*b*, 12*c*, 12*d*, and the top end 106 of an adjacent modular element attaches to a bottom portion 108 of the same connecting ring, 12*a*, 12*b*, 12*c*, 12*d*.

Figure 6:
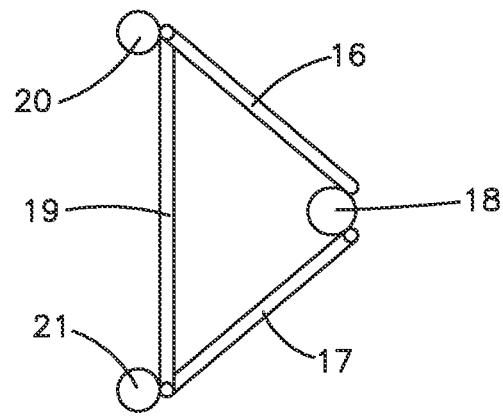
FIG. 6 is a cross-sectional view of a connecting ring, according to an embodiment of the present invention.
Figure 7:
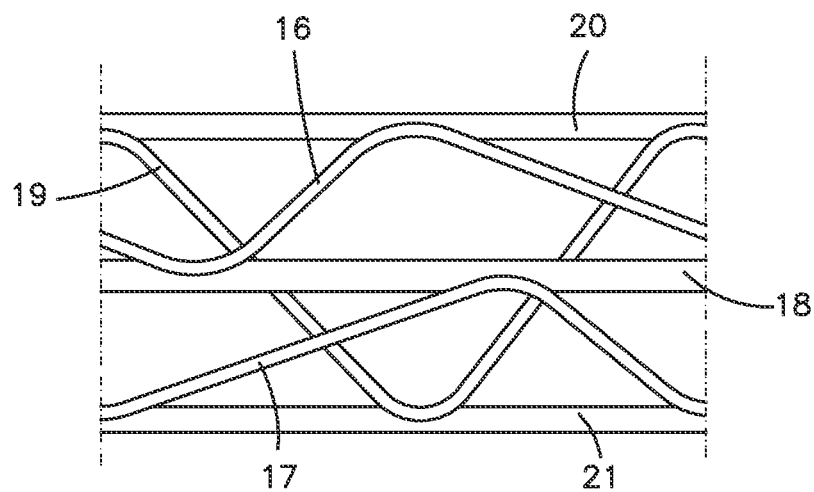
FIG. 7 is a side view of the connecting ring depicted in FIG. 6.

Depicted in FIGS. 6 and 7 is another embodiment of a one-piece connecting ring that can be used to join the modular elements together. As shown in the figures, the cross-section of the connection ring can be in the shape of an equilateral triangle. Forming the triangular-shaped connection ring are three circular bars, 18, 20, 21. Joining the circular bars, 18, 20, 21, to each other are an additional three bars, 16, 17, 18, that, as can be seen in FIG. 7, are in the form of a sinusoid, thereby forming a truss-like structure. Thus, sinusoidal bar 16 connects bars 18 and 20 to each other, sinusoidal bar 17 connects bars 18 and 21 to each other, and sinusoidal bar 19 connects bars 20 and 21 to each other. Moreover, the cross-sectional profile of the one-piece connection ring can be H-shaped or U-shaped.

Figure 8:
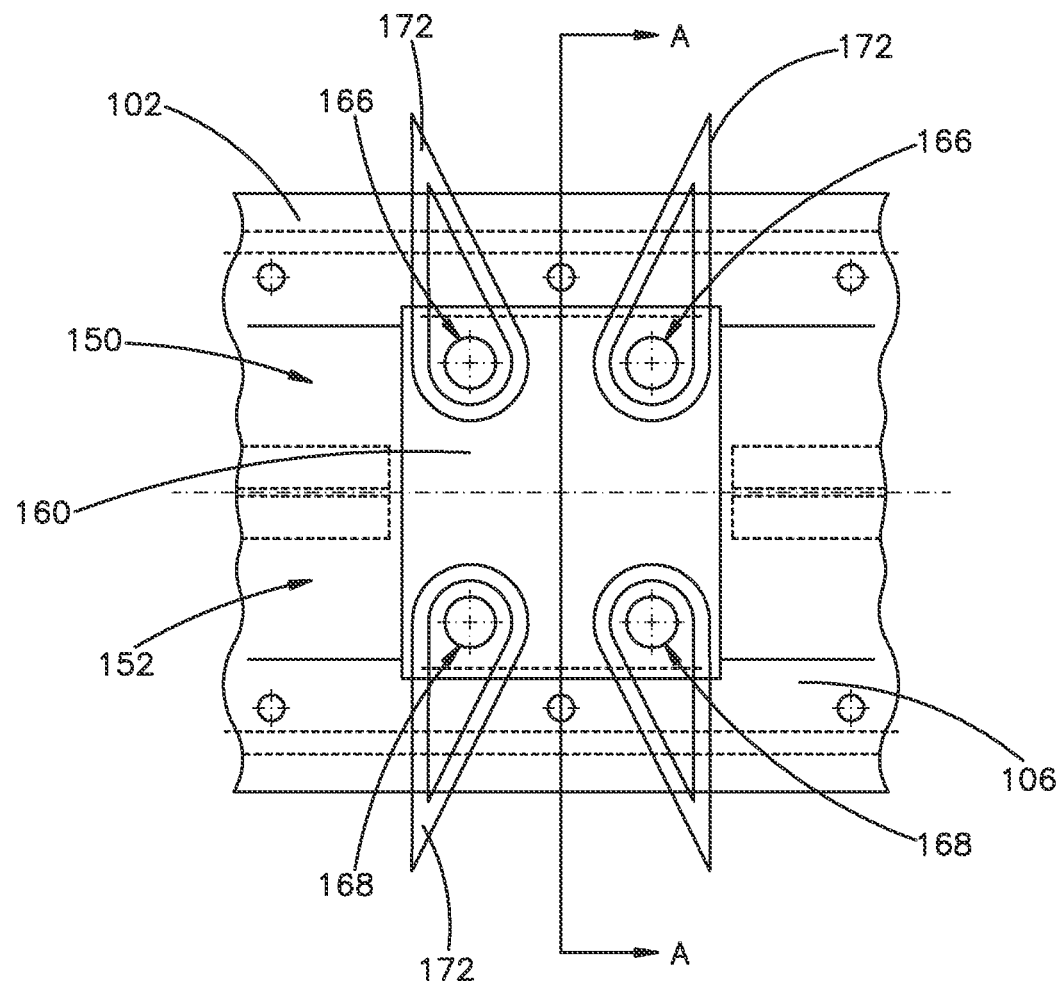
FIG. 8 is a plan view of a connecting ring attached to the fabric membrane of adjacent modular elements, according to an embodiment of the present invention.

In another embodiment, as depicted in FIGS. 8 and 9, the connecting rings, 12*a*, 12*b*, 12*c*, 12*d*, can be a two-piece structure having a top half 150 and a bottom half 152 where the bottom end 102 of one modular element attaches to the top half 150 of the connecting ring, 12*a*, 12*b*, 12*c*, 12*d*, and the top end 106 of an adjacent modular element attaches to the bottom half 152 of the connecting ring, 12*a*, 12*b*, 12*c*, 12*d*. As can be seen in FIG. 9, each half of the two-piece connection ring can be u-shaped such that each half has an inner portion 154 (a portion located on the interior of the fabric membrane 100) and an outer portion 156 (a portion located on the exterior of the fabric membrane 100). Each half of the connecting ring may also include (i) a plurality of openings or slots 158 in its horizontal surface to receive a connection plate 160 having a plurality of holes 162 therein, and (ii) a plurality of holes 164 on the vertical surfaces of the inner and outer portions, 154, 156, which correspond to the plurality of holes 162 in the connection plate 160. Thus, as depicted in FIGS. 8 and 9, in order to connect adjacent modular elements together, the top half 150 and the bottom half 152 of the connecting ring are brought into contact with each other such that the plurality of openings or slots 158 line up with each other. Once the top and bottom halves, 150, 152, of the connection ring are aligned, a plurality of connection plates 160, each including at least one top hole 166 and one bottom hole 168, which correspond to the holes 164 in the top and bottom halves, 150, 152, of the connecting ring, are inserted into the openings or slots 158. Lastly, bolts, pins, or similar structures 170 are inserted into the holes 164 in the top and bottom halves, 150, 152, of the connecting ring and through the holes, 166, 168, in the connection plate 160. If bolts are used, the holes on the inner portions 154 of the connecting rings may be threaded to receive the threaded bolt.

Having a two-piece connecting ring makes joining the modular elements together during the deployment process (discussed below) easier and quicker, thus reducing deployment time. Deployment time is reduced because each half of the connection ring can be attached to a modular element on shore prior to deployment. Then, during deployment, each half of the connecting ring can be joined together, for example, in the manner described above, which is quicker and easier than joining the ends of adjacent modular elements to a single connection ring through clamping, which may require the use of hundreds of screws for each end of the modular elements.

In another embodiment, the connecting rings, 12*a*, 12*b*, 12*c*, 12*d*, can be a torus-shaped fabric structure that is filled and inflated with water and super pressurized by one or two pairs of bladders filled with oil where at least one bladder is included in the torus-shaped structure and at least another bladder is located 20 to 40 m deeper. These bladders are connected to each other with a hose, pipe or other similar structure. The difference in densities between oil and sea water at this depth generates 400 to 800 millibars of suppression in the torus, regardless of depth. That is, water pressure on the lower bladder is transmitted to the upper bladder in the torus through the hose or pipe that connects the two bladders. This occurs because, as previously discussed, oil is less dense than water and thus, for every 20 meters of depth, 2 bars of water pressure is created. Thus, a 20 m difference in depth between the oil in the 2 bladders produces 1.6 bars of pressure (density=0.8 kg/dm$^3$). Therefore, the pressure in the upper bladder is 0.4 bars (or 400 millibars) more than that of the water surrounding the torus, which provides the surppression or stiffness.

Figure 11:
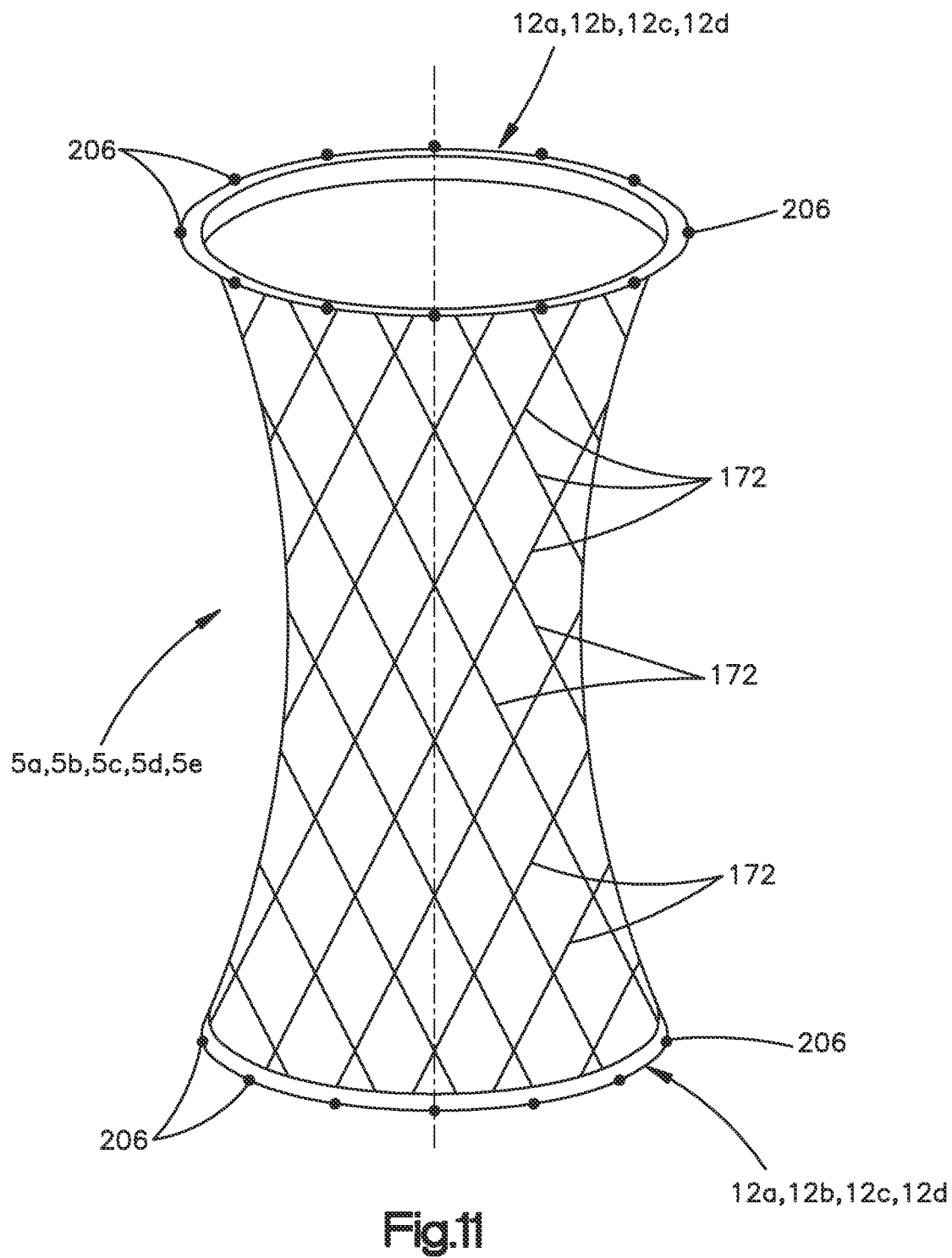
FIG. 11 is a depiction of the modular element of FIG. 10.
Figure 12:
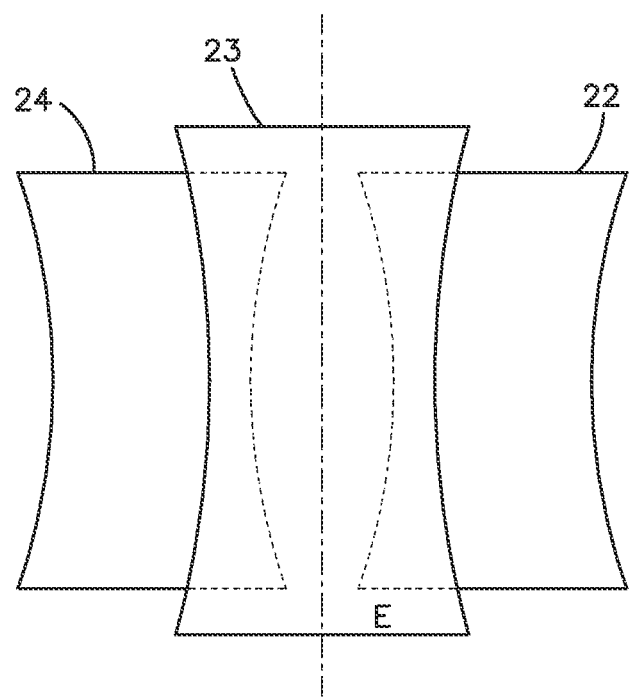
FIG. 12 is a schematic drawing of a plurality of panels that are used to construct the modular element of FIGS. 5 and 6.

As shown in FIGS. 10 and 11, when the tubular apparatus 1 is vertically or axially tensioned, each modular element, 5*a*, 5*b*, 5*c*, 5*d*, 5*e*, contracts in the radial direction, thereby reducing the middle diameter by approximately 15% and forming a paraboloid hyperbolic structure. The top end and bottom end of each modular element maintains its original diameter as a result of the attached connecting rings, 12*a*, 12*b*, 12*c*, 12*d*. Thus, because of the paraboloid hyperbolic shape of the tensioned modular elements, the fabric panels that are used to construct each modular element cannot be simple rectangles. Instead, as depicted in FIG. 12, separate panels, 22, 23, 24, each having the paraboloid hyperbolic shape shown in FIG. 12, are joined together along their vertical or sloped edges such that when all of the panels, 22, 23, 24, are joined, the paraboloid hyperbolic cylindrical structure depicted in FIGS. 10 and 11 is formed. The panels, 22, 23, 24, can be joined or bonded to each other by high frequency welding. As will be apparent to those skilled in the art, other methods may also be used to join the panels to each other. As depicted in FIG. 12, face E is the exterior face of the modular element.

To help reinforce each individual modular element, 5*a*, 5*b*, 5*c*, 5*d*, 5*e*, as depicted in FIG. 11, the fabric membrane 100 that forms the modular elements can be reinforced by synthetic ropes, cables, or similar structures 172 that are crossed with each other and straight tensioned between the connection rings. These reinforcing structures 172 act as hyperbolic surface generators and withstand the axial tension, which is transmitted to the connection rings from the adjacent modular elements. In addition, connecting these reinforcing structures 172 in this manner, helps aid against torsional stresses. As can be seen in FIG. 8, in one embodiment, the reinforcing structures 172 can be attached to the elements 170 that are used to fasten the top and bottom halves, 150, 152, of the two-piece connecting rings together.

Figure 13:
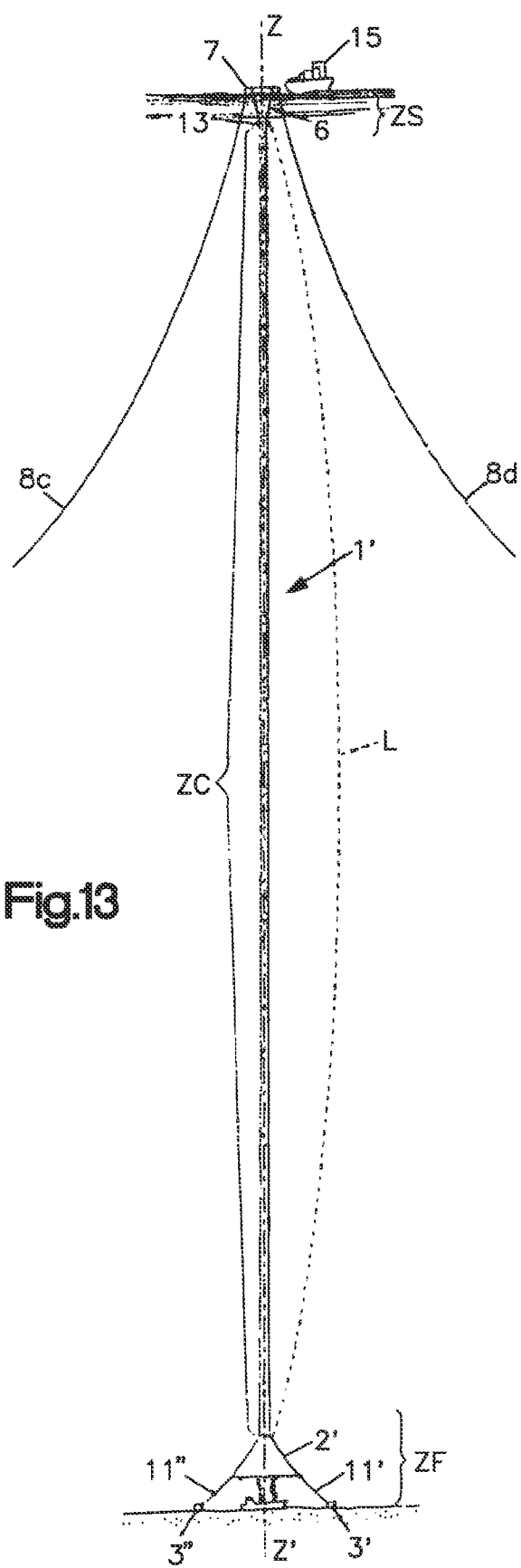
FIG. 13 is a schematic drawing of a tubular apparatus in operation, according to an embodiment of the present invention.

Depicted in FIG. 13 is another embodiment of a tubular apparatus 1'. In FIG. 13, the same reference numbers are used for components similar to those shown in FIG. 1. As can be seen in FIG. 13, the base 2' is attached to the ocean floor using cables or ropes 11' and 11" that attach to anchoring blocks 3' and 3" positioned on the ocean floor and the floating means 7 on the ocean surface is anchored in position using ropes or cables 8*c* and 8*d* that are also attached to anchoring blocks on the ocean floor. As can further be seen in FIG. 13, zone ZF is the zone that includes the base 2' and the anchoring blocks 3' and 3" and zone ZC is the zone that includes the modular elements that form the vertical column or passageway. In ideal conditions in calm seas without any currents, the modular elements in zone ZC assume a vertical position depicted by line Z-Z'. However, in high currents, because both the floating means 7 and the base 2' are anchored in position, the modular elements in zone ZC assume the shape depicted by dotted line L in FIG. 13. The modular elements in zone ZC can assume shape L without fear of damage because the fabric materials used to construct the modular elements are flexible. Thus, the chimney apparatuses according to embodiments of the present invention, avoid the problems of damage associated with using rigid piping in high current conditions. As with the tubular apparatus 1 of FIG. 1, a barge or tanker 15 can be used to harvest the recovered oil or fluid.

The materials used to construct the modular elements, 5*a*, 5*b*, 5*c*, 5*d*, 5*e*, and the base 2, can be textile fabrics made of synthetic yarns and are such that the fabrics are impermeable to fluids, i.e., seawater and oil. Accordingly, the column of water created by the tubular apparatus, is isolated from the surrounding water and, as a result, prevents the surrounding water from becoming contaminated with any oil or other contaminants that enter and rise up the tubular apparatus. Thus, the tubular apparatus can be used to form an impermeable barrier between the column of water contained on its interior and the water on its exterior.

The fabric can be a pre-stressed fabric, for example, Précontraint® 1502 from the Ferrari® Textiles Corp. The internal side of the fabric, i.e., the side of the fabric on the interior of the modular elements or base, can be coated with an anti-adhesive coating or laminated with an oil repellant in order to prevent the oil or other fluids from adhering or sticking to the interior surfaces of the tubular apparatus 1 as the oil or fluids ascend within the tubular apparatus 1. Examples of this coating include, and are not limited to Tedlar® and Teflon® from DuPont™, PTFE (polytetrafluoroethylene), silicone, and any other coating that has anti-adhesion properties. The anti-adhesive coatings as well as additional coatings, can be used to help render the modular elements and the base of the chimney apparatus impermeable to water and other fluids.

Although embodiments of the present invention have been described as having fabric or textile components, as will be apparent to those skilled in the art, additional materials may be used.

Figure 14:
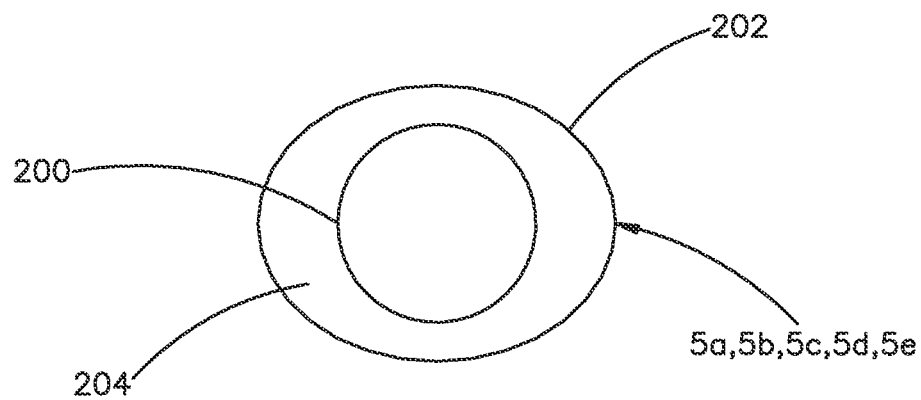
FIG. 14 is a cross-sectional view of a modular element, according to an embodiment of the present invention.

Some applications may require that the tubular apparatus 1 have thermal insulative properties either (1) to protect against the colder water at the deeper portions of the tubular apparatus 1 and thereby prevent any gas associated with leaking oil from crystallizing or (2) to keep the deeper water cold as it rises to the surface so it can be used in an OTEC or SWAC process. As depicted in FIG. 14, the required thermal insulation can be achieved by constructing the modular elements, 5*a*, 5*b*, 5*c*, 5*d*, 5*e*, and the base 2 as a double-walled structure so that the modular elements and base would be structures comprised of an inner wall 200 and an outer wall 202 with a gap 204 therebetween. That is, the tubular apparatus 1 would comprise a pair of concentric structures. Thus, a layer of water, which would act as an insulator, would be maintained in the gap 204 between the inner and outer walls, 202, 204, of the tubular apparatus, thereby inhibiting convection and only allowing thermal conduction to take place on a small scale. Moreover, in order to help prevent gas crystallization or to bring warm water down to the base of the chimney apparatus, a pipe can be inserted within the vertical column formed by the modular elements down to the base. This pipe can be used to bring warm water down to the base in order to heat the oil or any crystals that form. Naturally warmer water from the surface can be used or colder water can be heated. Warm water can be delivered down to the base simply by maintaining a column of water at a certain height above the water surface thereby creating a head pressure that naturally forces the warm water down the pipe towards the base.

A non-limiting example of a structure constructed in accordance with embodiments of the present invention will now be discussed with reference to FIG. 1. A prestressed fabric (i.e. a fabric coated with warp yarns and weft yarns under tension) having polyester warp and weft yarns coated with PVC (polyvinyl chloride) is used. As previously discussed, the fabric can be Ferrari® Textiles Corp.'s Précontraint® 1502 fabric. For a chimney apparatus 1 to be used at a depth of 3,800 m, approximately 74 modular elements each having a height of 50 m are needed. For each of these modular elements, the top and bottom diameter (the diameter of the connection ring) will be 12 m and the constrained middle diameter will be 9 m. As discussed above with reference to FIG. 12, each modular element is constructed from a plurality of fabric panels, 22, 23, 24, that are joined together along their lengths. However, to produce the instant 12 m diameter modular elements, twelve 2.50 m wide panels are joined together.

The base 2 is made from the same fabric as the modular elements and has a bottom diameter of 120 m and a top diameter of 12 m corresponding to the diameter of the first connection ring 5a, which is connected to the top of the base 2. A base 2 of this size has an approximate weight of 25 to 30 metric tons. In order to connect the modular elements to each other and to the base 2, 75 connection rings will be used, each having a diameter of 12 m. In one embodiment, the connection rings will be aluminum and will have a height of approximately 55 cm. As depicted in FIGS. 6 and 7, bars 20 and 21 have a diameter of approximately 40 mm, bar 18 has a diameter of approximately 50 mm, bars 16, 17 and 19, which connect to or brace bars 19, 20 and 21, approximately every 50 cm, have a diameter of 20 mm. It is not unreasonable for a chimney apparatus 1 of this size to recover oil, for example, on the magnitude of 100,000 to 200,000 barrels per day.

Deployment of the tubular apparatus 1 according to an embodiment of the present invention will now be described with reference to FIGS. 1 and 13. All of the elements that make up the tubular apparatus 1 can be stored on land and then loaded onto specially adapted barges or platforms. Such barges or platforms would be adapted to have some type of central opening or can be horseshoe-shaped to allow the tubular apparatus 1 to be lowered into place. These barges or platforms would include all of the equipment and controls to deploy the chimney apparatus 1. All of the winches, capstans, hydraulic jacks, cables, ropes, cranes, generators, etc., would also be included on these barges or platforms such that the deployment operation would be self contained.

Because the modular elements are made from a fabric material, each modular element can be folded onto itself within its connection rings thereby forming a folded structure that is very compact and does not take up much space (when folded, the volume of each modular element is reduced by approximately 90%). The base 2 can also be folded and stored in a similar manner. Because the elements of the chimney apparatus 1 can be folded and thus, reduced in volume, storage costs are reduced. When needed, all of the chimney apparatus 1 components are loaded onto the specially adapted barges or platforms and brought out to the recovery site. Again, because the components can be folded and their volumes reduced, more components can be included on fewer barges or platforms reducing deployment costs and deployment times as less trips to the deployment site will be necessary.

Once at the deployment site, the anchoring blocks, 3a, 3b, 3c, 3d, 3e, 3f, 3g, are positioned on the ocean floor 4 around the recovery area. Connected to the anchoring blocks, 3a, 3b, 3c, 3d, 3e, 3f, 3g, by way of sheaves or other similar device, 26a and 26b, are a plurality of cables or ropes, 11a, 11b, 11c, 11d, 11e, 11f, 11g. One end of these cables or ropes, 11a, 11b, 11c, 11d, 11e, 11f, 11g, fixedly attach to the bottom of the base 2 by way of connecting rings, 14a, 14b, 14c, 14d, 14e, 14f, 14g, and the other end of the cables or ropes attach to winches, capstans or hydraulic jacks included on the barges or platforms. The length of cables or rope required for the ocean depth at the recovery site is also stored on these winches, capstans or drums included on the barges or vessels. Connecting the cables or ropes to the anchoring blocks, the base 2, and the winches, capstans, or hydraulic jacks, allows the anchoring blocks with the ropes or cables connected through the sheaves first to be lowered into position on the ocean floor and then permits the base and modular elements to be lowered to the ocean floor only after all of the anchoring blocks are positioned. In other words, connecting the ropes or cables to the anchoring blocks is not a two step process. Because sheaves are used, the anchoring blocks can be lowered in position with the ropes or cables attached, without dragging the base along with them. Thus, because the ropes or cables are already attached to the anchoring blocks through the sheaves, after the anchoring blocks are positioned, a separate procedure is not required to attach the cables to the already positioned anchoring blocks.

Once the anchoring blocks are positioned, the base 2 and connected modular elements can then be winched down into position on the ocean floor. During the winching process, the cables or ropes, one end of which is attached to the winches, capstans or hydraulic jacks, and the other end of which is attached to the base 2, travel through the sheaves on the anchoring blocks and are taken in by the winches, capstans, or hydraulic jacks, thereby causing the base 2 to be pulled down towards the anchoring blocks into position. When modular units are added to the tubular apparatus 1, the shackles 210 on the connecting rings (see FIG. 11) are attached to the ropes or cables. Thus, when the cables are tensioned, the base 2 assumes its desired conical or funnel shape and the modular elements that form the vertical portion in zone ZC, are vertically stabilized. Deployment in this manner, allows the tubular apparatus 1 to be lowered into position on the ocean floor without the need for human interaction on the ocean floor. Instead, the deployment process can be monitored on the ocean floor by way of a remotely operated vehicle (ROV). Further, anchoring the base 2 to the ocean floor 4 in this manner, allows the position of the base 2 to be adjusted by loosening certain ropes or cables while tightening certain other ropes or cables.

During the deployment process, as the base 2 is winched down into position on the ocean floor, each modular unit is attached to the preceding modular unit by way of the connecting rings. Thus, the tubular apparatus 1 is essentially constructed on site as it is being lowered into position.

As previously discussed, embodiments of the present invention avoid the gas crystallization problems of prior devices. Additional reasons as to why crystallization of gas is not an issue with the present chimney apparatus include (1) the large diameter of the vertical column formed by the base and the modular elements, minimizes if not eliminates any possibility of any crystals that form from obstructing the chimney apparatus and (2) as any crystals that form rise to the surface within the vertical column, the seawater in the column, which naturally warms up closer to the surface, also warms the crystals causing the crystals to regenerate as a gas. Any crystals that do make it to the surface can be collected and burned off. Essentially, the large diameter of the chimney apparatus permits the leaking oil and any gas crystals that form, to behave as they normally would in the open ocean.

In order to avoid any possibility of leaking oil from escaping and polluting the oceans during offshore drilling operations as a result of damage to the subsurface well or piping, the present chimney apparatus could be used as a permanent containment vessel that encloses all of the oil piping, structures and equipment that extend from the oil rig to the well on the ocean floor. Thus, any leaking oil would rise within the column of water formed by the chimney apparatus and would be collected or contained at the surface by a collecting means 6. Any oil collected by the collecting means 6, would then be pumped or siphoned off into the regular components on the oil rig that are used to retrieve and collect oil from the well. In addition to providing a containment vessel for leaking oil, the chimney apparatus would, as discussed above, provide a column of calm water around the oil piping, thereby sheltering the piping from rough sea conditions and possible damage.

The oil piping can be stabilized and/or centered within the chimney apparatus by structures that attach to the piping and the connecting rings of the modular elements.

If the tubular apparatus disclosed herein is used for OTEC or SWAC, the collecting means 6 at the top of the tubular apparatus 1 may not be necessary. Instead, the last or topmost modular element may form a surface structure that can be connected to the OTEC or SWAC platform or plant for delivery of the cold seawater.

Not only can the present tubular apparatus 1 be used to collect and transport fluids vertically as depicted in FIGS. 1 and 13, it may also be used to collect and transport fluids horizontally or along an incline. Such configurations may be used to cross underwater canyons.

Figure 15:
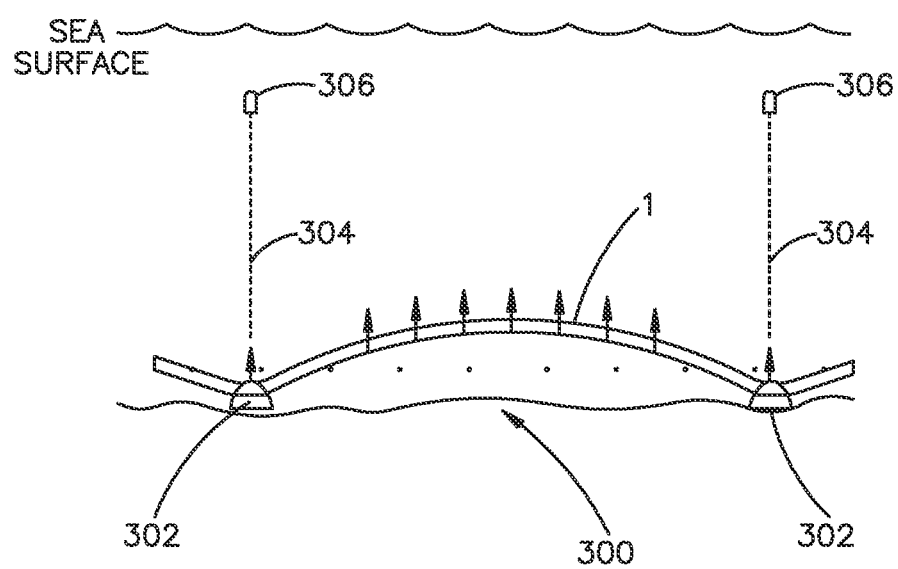
FIG. 15 is a schematic drawing depicting a tubular apparatus in operation, according to an embodiment of the present invention.

In one embodiment, as depicted in FIG. 15, when the tubular structure 1 is naturally buoyant (based on certain conditions of use), the tubular structure 1 can be anchored at multiple points along its length on the body of water's bottom 300. Ballasts or any other anchoring means 302 previously disclosed herein, may be used to anchor the tubular structure 1. In one embodiment, the anchoring means 302 is a deadweight created by a special connecting box that can resist the tension and lift created by the buoyant tubular structure 1. The connecting box can be lowered with the tubular structure 1 attached using cables or similar structures 304, which can be attached to floats or similar structures 306, which can be used to tension the cables 304. Because of the tubular structure's 1 buoyancy, it forms a parabolic arc between the anchor points as depicted in FIG. 15. Essentially, in this embodiment, the tubular structure 1 forms its own catenary, which is tensioned axially.

Figure 16:
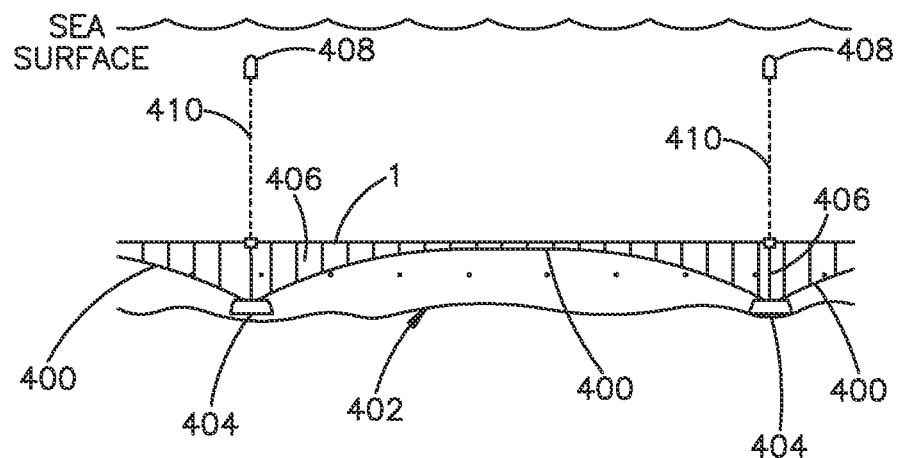
FIG. 16 is a schematic drawing of a tubular apparatus in operation, according to an embodiment of the present invention.

In another embodiment where the tubular structure 1 is naturally buoyant, as depicted in FIG. 16, a catenary cable 400 may be used to hold the tubular structure 1 in a horizontal configuration. In this embodiment, the catenary cable 400 is anchored to the body of water's bottom 402 at multiple locations using any of the previously disclosed anchoring means 404. The buoyant tubular structure 1 is then be attached to the catenary cable 400 at numerous locations along its length using a plurality of tether means 406, which may be cables or the like. These tether means 406 may, for example, attach to the tubular structure's connecting rings. In addition, floats or similar structures 408 attached to the tubular structure 1 by way of tethers 410. Using floats 408 eases the deployment of the tubular structure 1 within the body of water and can be used to raise the tubular structure for maintenance. Thus, in this configuration, the buoyant tubular structure 1 is tethered in place within the body of water in the configuration depicted in FIG. 16.

Figure 17:
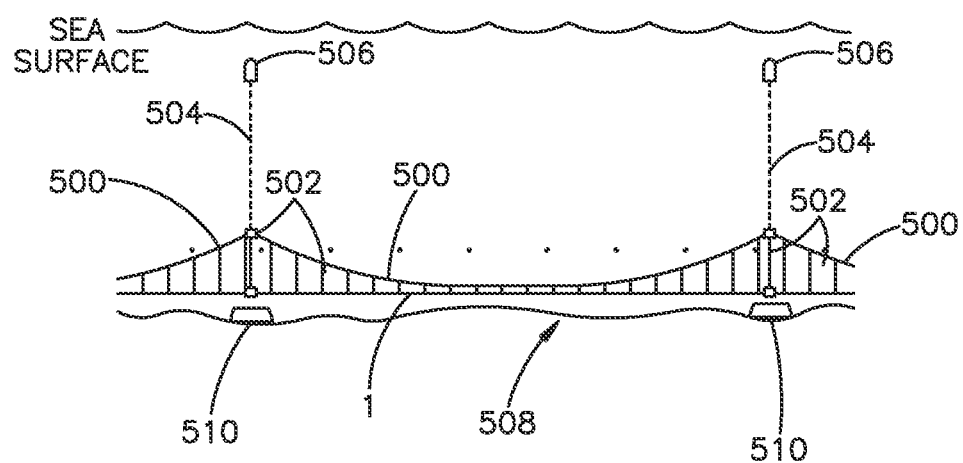
FIG. 17 is a schematic drawing of a tubular apparatus in operation, according to an embodiment of the present invention.

In another embodiment depicted in FIG. 17 where the tubular structure 1 is not buoyant, the tubular structure 1 can be suspended, for example, by its connecting rings, from a catenary cable 500 within the body of water using a plurality of suspension cables 502. In this embodiment, the catenary cable 500 is attached to multiple vertical tethers 504, which can be cables or the like. One end of the vertical tethers 504 connects to a float or similar structure 506 and the other end of the tethers 504 are anchored to the body of water's bottom 508 using any of the previously disclosed anchoring means 510. Thus, in this configuration, the tethers 504 are vertically suspended within the body of water, thereby causing the catenary cable 500 and the tubular structure 1 to also be suspended in the body of water in the geometry depicted in FIG. 16 (similar to a suspension bridge).

Figure 18:
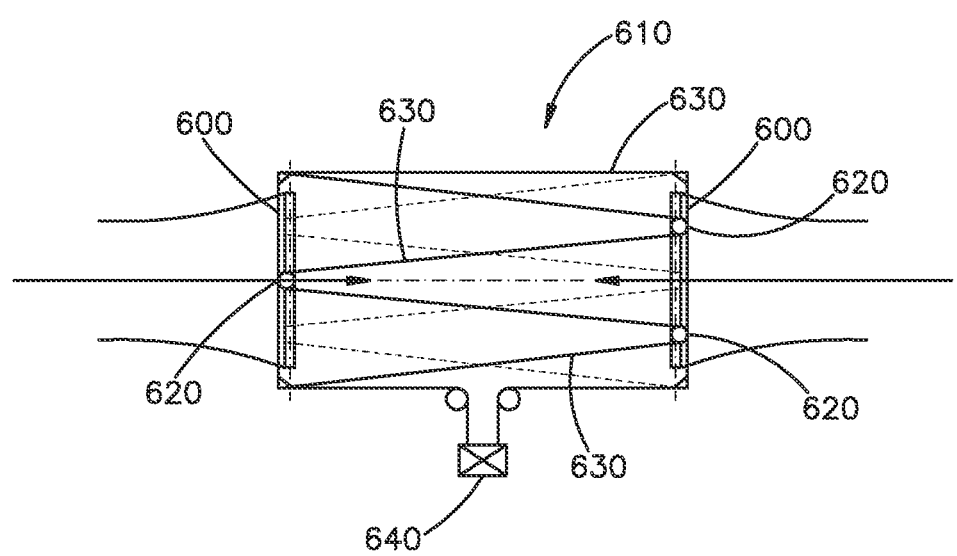
FIG. 18 is a schematic drawing of a special modular element that can be used to tension horizontal or inclined tubular structures.

Because horizontal or inclined tubular structures cannot be tensioned by gravity like vertical tubular structures, axial tensioners must be employed. These tensioners are used to adjust the length of the tubular structure and are in the form of specially constructed modular elements. FIG. 18 depicts an embodiment of such a tensioner. As can be seen in FIG. 18, the connecting rings 600 at each end of the tensioning modular element 610 are surrounded by a structure comprising a plurality of pulleys 620, for example, 8 pulleys on each structure. Running between the pulleys 620 is a cable. If 8 pulleys 620 on each structure are used, 16 reeving lines 630 are formed. The cable and hence the reeving lines 630, are tensioned by a counterweight 640 of, for example, 10 tons, that is attached to the two cable ends. This configuration creates a tension of 80 tons between the connecting rings 600. These tensioning modular elements 610 can be installed between standard modular elements and can be spaced a few hundred meters apart. Lastly, because the length of these tensioning modular elements 610 can be lengthened or shortened, the fabric or membrane that makes up these modular elements is accordion-shaped.

Figure 19:
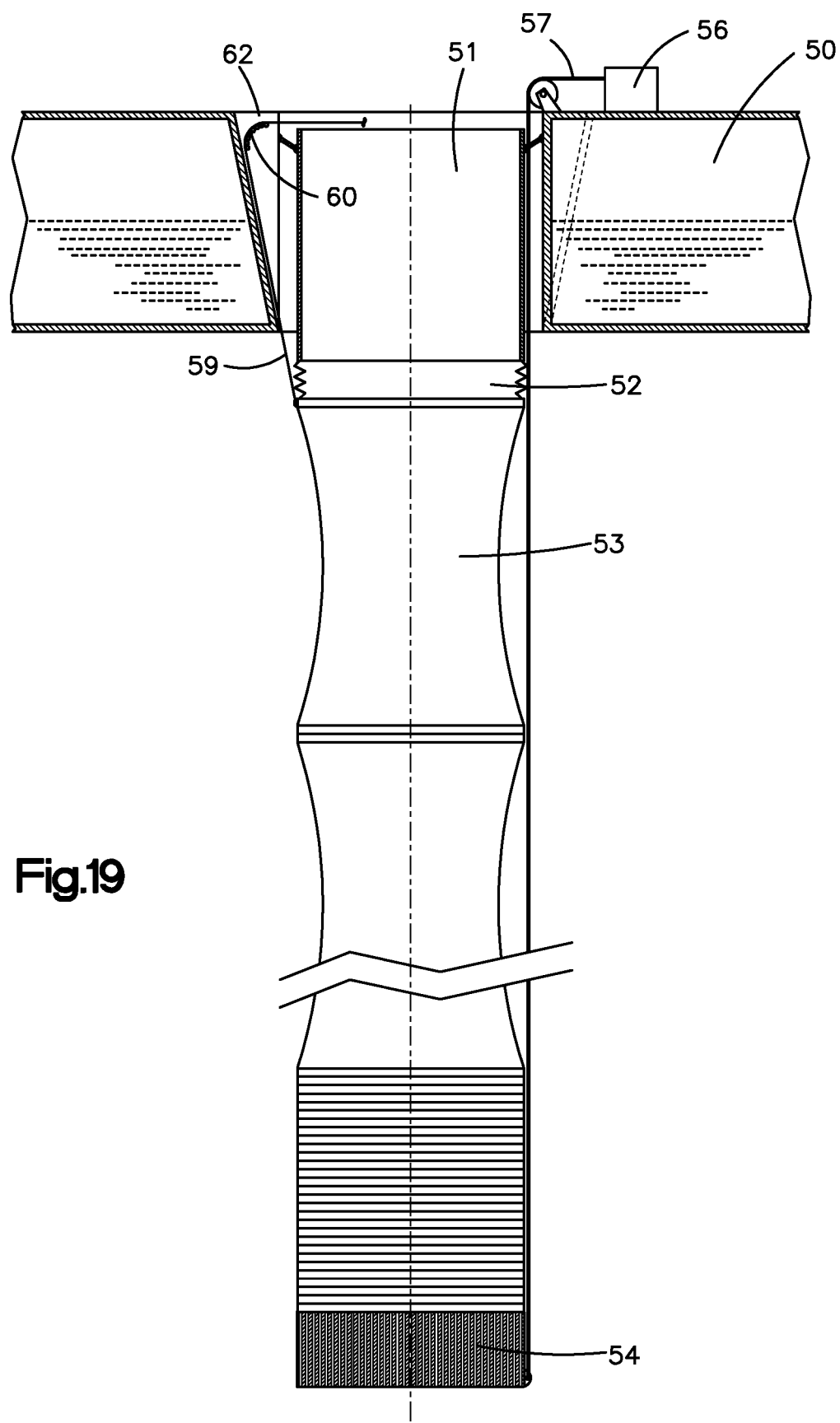
FIG. 19 shows a cold water piping system according to an embodiment of the present invention, for use in ocean thermal energy conversion (OTEC) and floating liquefied natural gas (FLNG) projects.

FIG. 19 shows a cold water piping system according to an embodiment of the present invention, for use in ocean thermal energy conversion (OTEC) and floating liquefied natural gas (FLNG) projects. FIG. 19 shows a floating platform 50, articulating tubular interface 51 with bellows 52 disposed at a bottom portion thereof, vertically mounted modular elements 53, and a strainer 54 used for sea water intakes and ballasting.

For the OTEC and FLNG application, the vertical conduit or pipe is called cold water pipe. In one embodiment, the cold water pipe is suspended directly from an anchored floating platform 50 without any fastening to the sea bed. The cold water pipe includes a plurality of modular elements preferably compacted for storage and handling under 10% of their height deployed, and assembled together. The cold water pipe suspended is tensioned by its own weight, by the strainer 54 weight and, if necessary, by a counterweight 64 located in the strainer.

Figure 20:
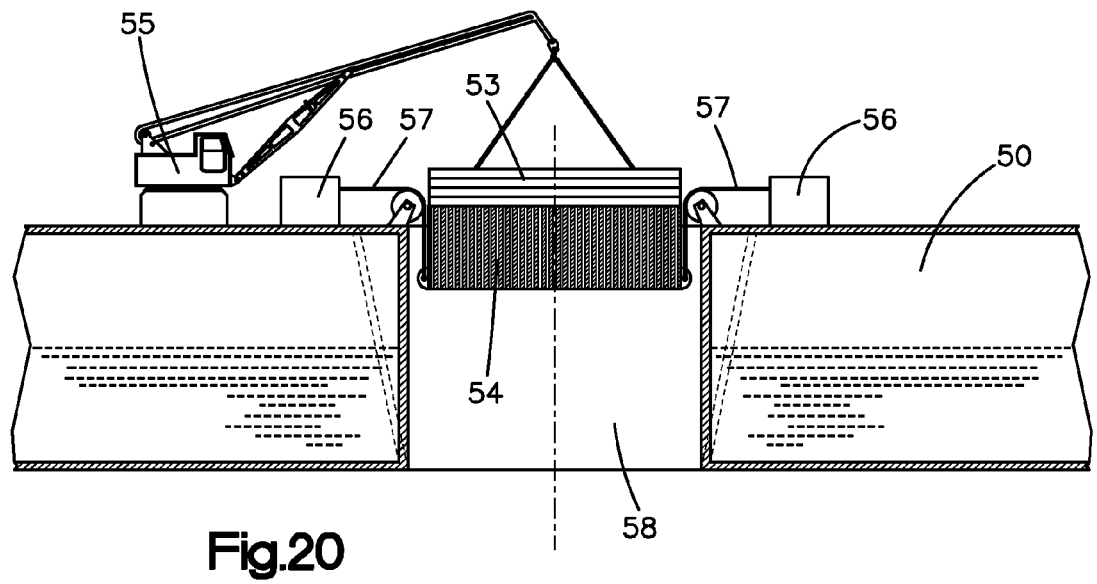
FIG. 20 shows the initial deployment of a cold water piping system shown in FIG. 19, where the strainer and ballast assembly along with certain modular elements are deployed downwardly by a combination of cranes, winches, and cables through the platform's center section.
Figure 21:
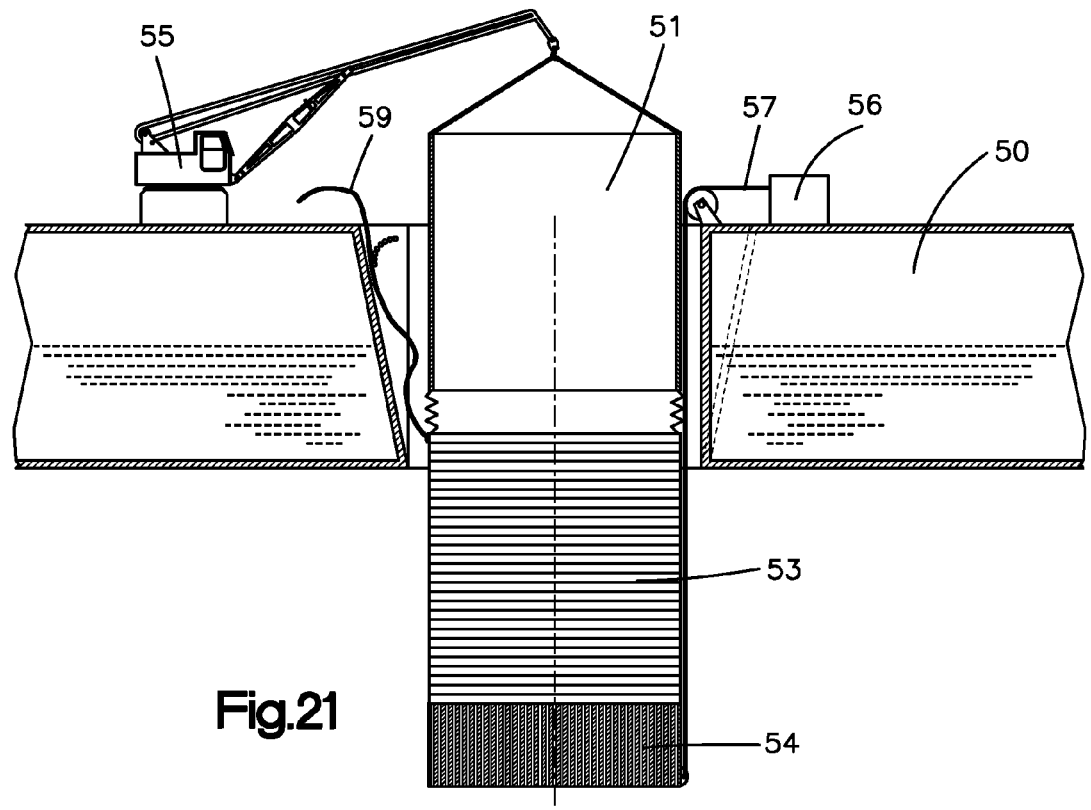
FIG. 21 shows further deployment of a cold water piping system shown in FIGS. 19 and 20, where the strainer and ballast assembly along with certain modular elements are deployed by a combination of cranes, winches, and cables downwardly through the platform's center section.

FIG. 20 shows the initial deployment of a cold water piping system shown in FIG. 19, where the strainer 54 and ballast assembly along with certain modular elements 53 are deployed downwardly by a combination and plurality of cranes 55, winches 56, and cables 57 through the platform's 50 center section, referred to from those of skill in the art as the moon pool 58. FIG. 21 shows further deployment of a cold water piping system shown in FIGS. 19 and 20, where the strainer 54 and ballast assembly along with certain modular elements 53 are further deployed and expanded as shown in FIG. 20. Before deployment, all the compacted modular elements 53 are stacked on the top of the strainer 54. A plurality of winches 56 including three or more winches located on the deck of the platform 50 are connected by a deployment cable 57 to the strainer 54. For modular element 53 assembly, the strainer 54 is lowered successively by the height of a compacted modular element 53, after each fastening between each modular element 53, made at deck level of the floating platform 50. Compacted modular elements 53 stored on deck are stacked in the moon pool 58 by a mobile crane 55 shown on FIG. 20. For deployment, after assembly, the top modular element 53 is kept back from the bottom of the platform by at least two suspension cables 59 and an articulated tubular suspension 51 described in more detail below.

The winches 56 lower the strainer 54 with the compacted modular elements 53 stacked on it, and all the lower stacked modular elements are successively deployed from the top. Then, as soon the strainer 54 is down enough, all the modular elements 53 are deployed and the whole pipe, tensioned, is hung to the suspension cables 59 (or the apparel 78-80), the deployment cables being slack. The reverse procedure allows crews on the floating platform 50 to lift up the cold water pipe.

As described above in this patent application, the modular elements 53 are made in soft membranes clamped between two solid rings in steel or composites. According to the internal depression level (in depth) the membrane will be made single, two or multi-ply. The external shape of the modular element 53, patterned to be an hyperboloide of revolution when deployed, and in tension as understood by a person of ordinary skill in the art, is able to withstand the internal depression of the cold water pipe during the ascending pumping.

An objective of the cold water pipe is to pump cold sea water from the lower level of the cold water pipe's deployment, that is, from the ocean's floor, where the water is much colder than the water temperature on the surface of the ocean. The modular elements 53 of the cold water pipe are preferably carried by the deployment cables 57 fastened to the bottom strainer 54. Deployment is effective when the top modular element 53 is held up by the suspension cables 59 which hang the cold water pipe when completely deployed; the deployment cables 57 becoming then slacken.

Figure 22:
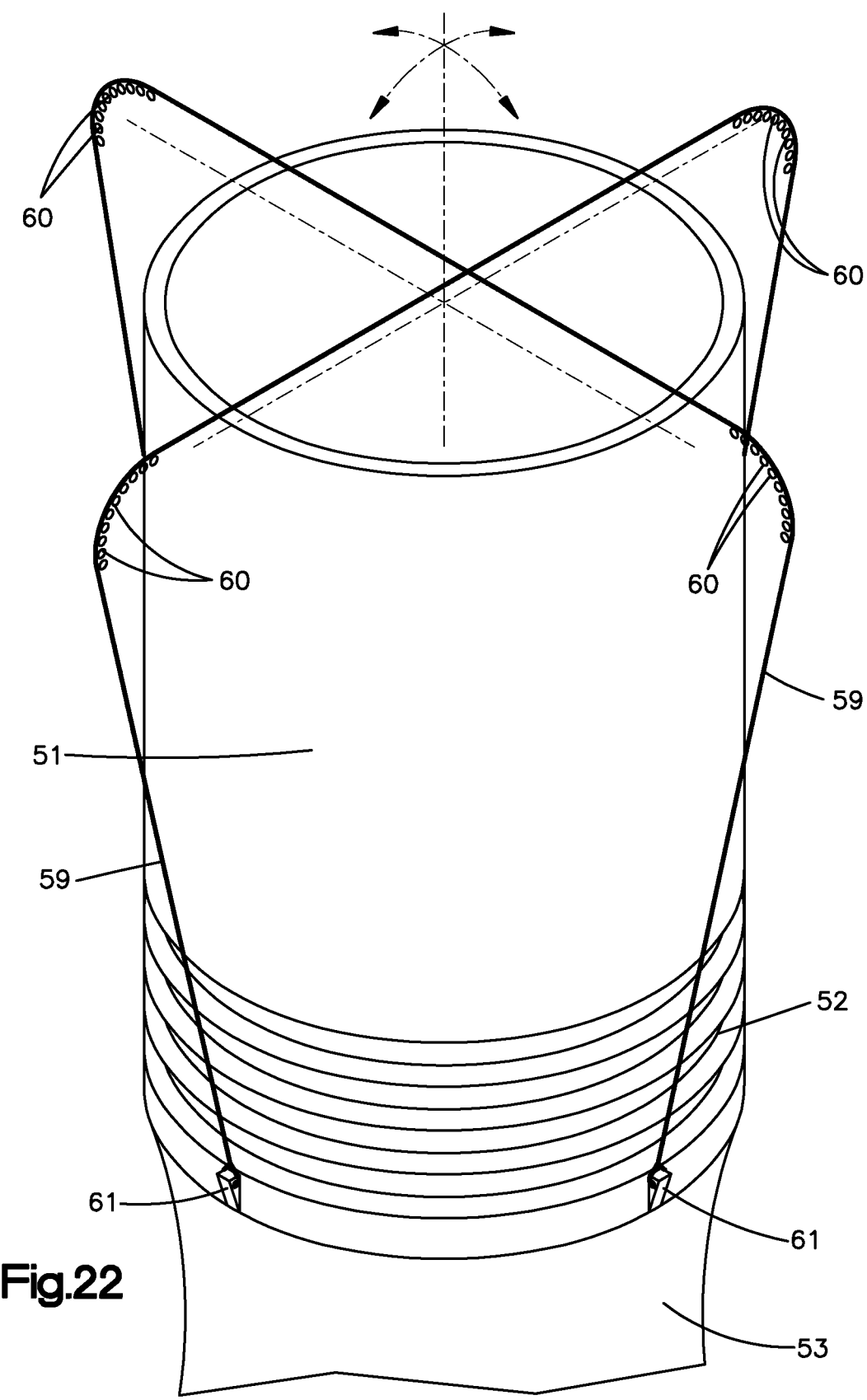
FIG. 22 shows a close up view of the articulating tubular interface shown in FIG. 19, along with its cable assembly and roller bearings.
Figure 23:
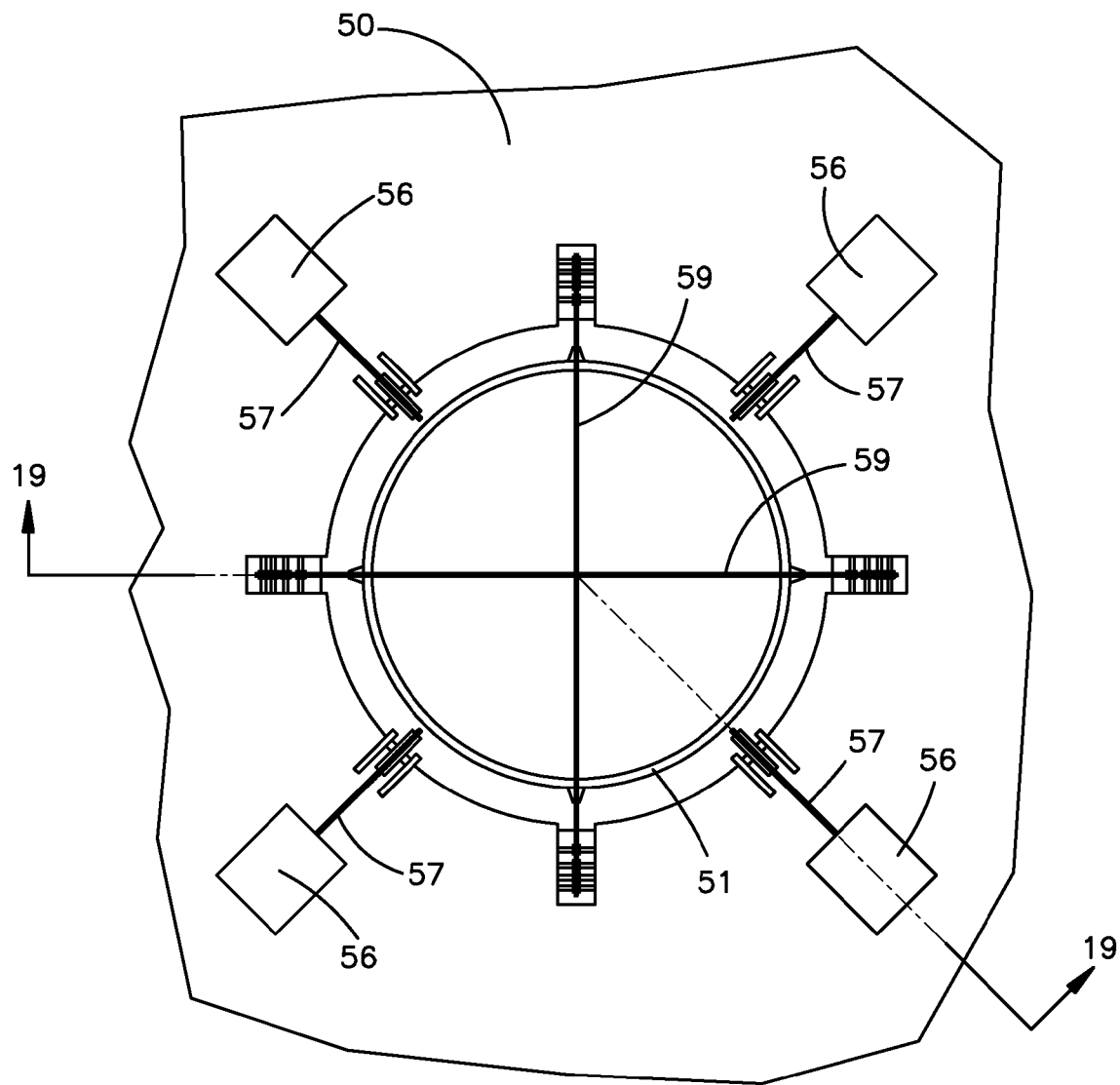
FIG. 23 shows a top view of the platform, winch assembly, articulated tubular interface, suspension cables including roller bearings, and deployment cables used in combination with winches to deploy and stabilize a cold water piping system according to an embodiment of the present invention shown in FIG. 19.

FIGS. 22, 23, 25, 26A, and 26B, further show an embodiment of the present invention directed to a "swinging interface" between the platform 50 and the cold water pipe. As shown in FIGS. 22 and 23, a preferred embodiment includes two suspension cables 59; they cross the moon pool 58 and the ends of the suspension cables 59 are fastened to the top modular element 53 at two diametrically opposed points. To avoid rubbing at their crossing in the moon pool 58 center the suspension cables are slightly separated in height; each suspension cable 59 preferably lays on two opposites pulleys or 2 arcs, the suspension cable slides on them when they move vertically with the angular motions of the platform 50, the ends of the suspension cables 59 with the cold water pipe top remaining practically still. Pulley arcs and cable parts going to the cold water pipe are lodged in four vertical cases around the pool at 90 degrees as shown on FIG. 23; deployment cables 57 and their winches 56 being between same.

A person of ordinary skill in the art will readily understand that a small crane as shown on FIGS. 20 and 21 is not enough to deploy the cold water pipe. It is only used to place the modular elements 53 stored on deck to the moon pool 58; the crane 55 does not carry the stacked elements which are supported by the deployment cables 57 fastened to the strainer 54. The suspension cables 59 are put in place only after the last modular element 53 is stacked on the others in the moon pool 58, suspension cable 59 ends are then fastened to the cold water pipe top portion to hold the cold water pipe up for deployment. The bellow 52 is also fixed at this stage. The platform's moon pool 58 is a vertical cylinder with four short rectangular recesses for the two suspension cables. The bellow's vertical displacement could be placed and fixed in the moon pool 58 above the water surface (shown in FIGS. 19-21). The deployment cables 57 do not interfere with the bellow 52 as shown in FIG. 19.

FIG. 22 shows a close up view of the articulating tubular interface including the bellows 52 disposed at the lower portion of the articulating interface 51 shown in FIG. 19, along with its roller bearing 60 and suspension cable 59 assembly. As shown in FIG. 22, the articulating interface preferably includes a tubular, cylindrical shape composed of fabric having a bellows 52 at a bottom portion thereof for connection to the uppermost/top modular element. One of the purposes of the bellows 52 is to have it act as the collapsible, flexible part of the articulating interface 51; a person of ordinary skill in the art will appreciate that the platforms 50 are located in ocean waters and the cold water piping can potentially extend several hundred meters downward. During inclement weather the platform 50 and cold water piping will be subjected to inclement weather including rain, high winds, and strong ocean currents. The bellows 52 portion of the articulating interface 51 permits required movement in light of the ocean environment and inclement conditions. As shown on FIG. 22, the bellows 52 is only part of the lower portion of the articulating interface 51, having an approximate length of preferably 20% of the total length of the articulating interface 51. This distance/length may of course vary based on ocean location and conditions as they vary around the world as understood by a person of ordinary skill in the art.

As further shown on FIG. 22 and discussed above, the articulating interface 51 shown therein includes two suspension cables 59 that are connected at the top of the first modular element, by known in the art means including chain plate 61 assemblies. As best shown in the top view of FIG. 23, the suspension cables 59 are secured to the floating platform with preferably a chain plate or other known in the art means for making such connection. A person of ordinary skill in the art will understand that FIGS. 22 and 23 do not show a suspension assembly that uses rigid wings, that is, there are no wings; the cables roll on the small circular features (e.g., roller bearings 60) shown in FIG. 22. After these roller bearings 60 are secured to the floating platform 50 with a chain plate or similar securing means, then the main articulating tubular interface 51 can swing in multiple directions. In fact, the main articulating tubular interface 51 works like a cardan joint, which is a type of universal joint having a crosslike piece, opposite ends of which rotate within a forked end of each of the two shafts connected.

Figure 25:
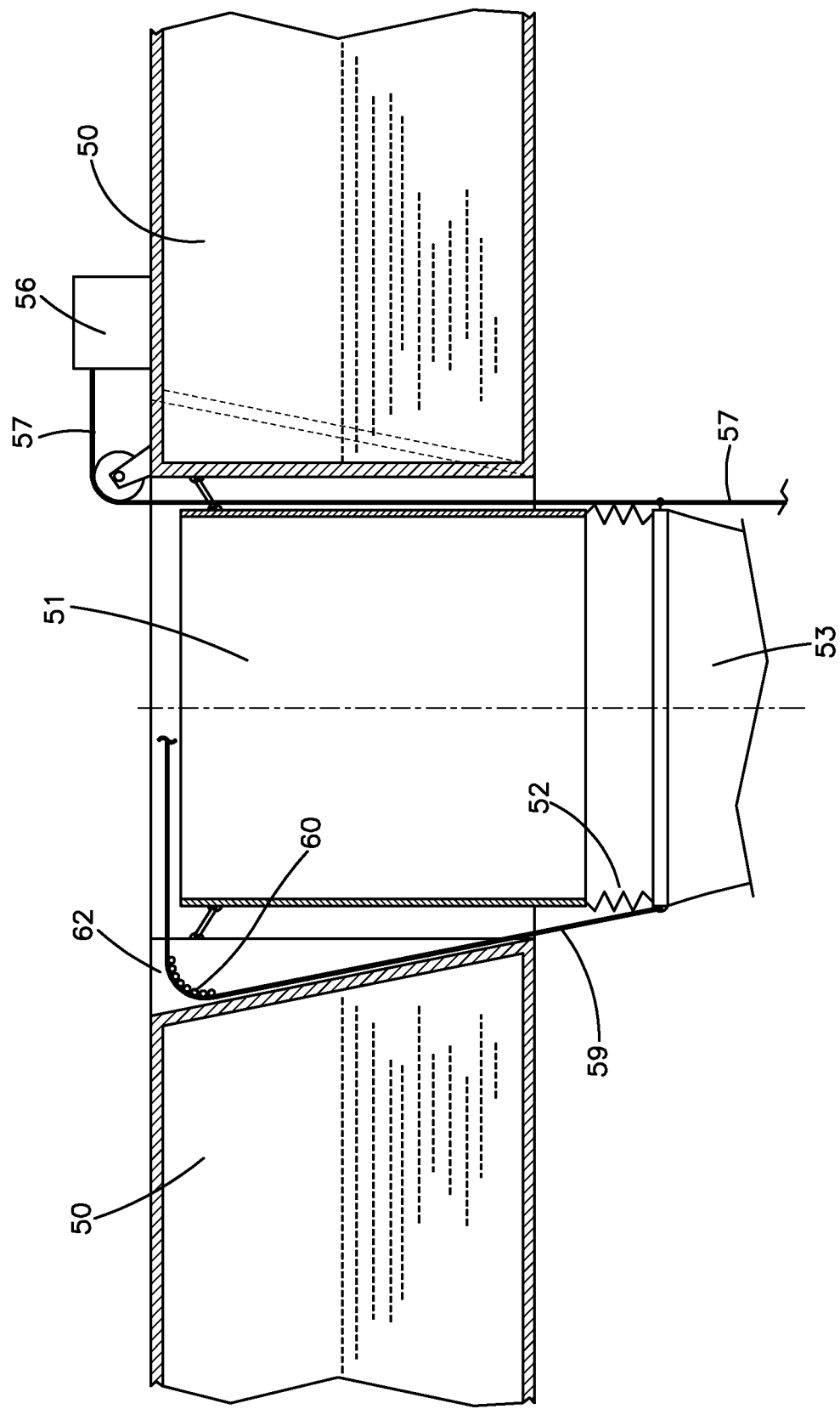
FIG. 25 shows a cold water piping system according to an embodiment of the present invention shown in FIG. 19, where
Figure 26A:
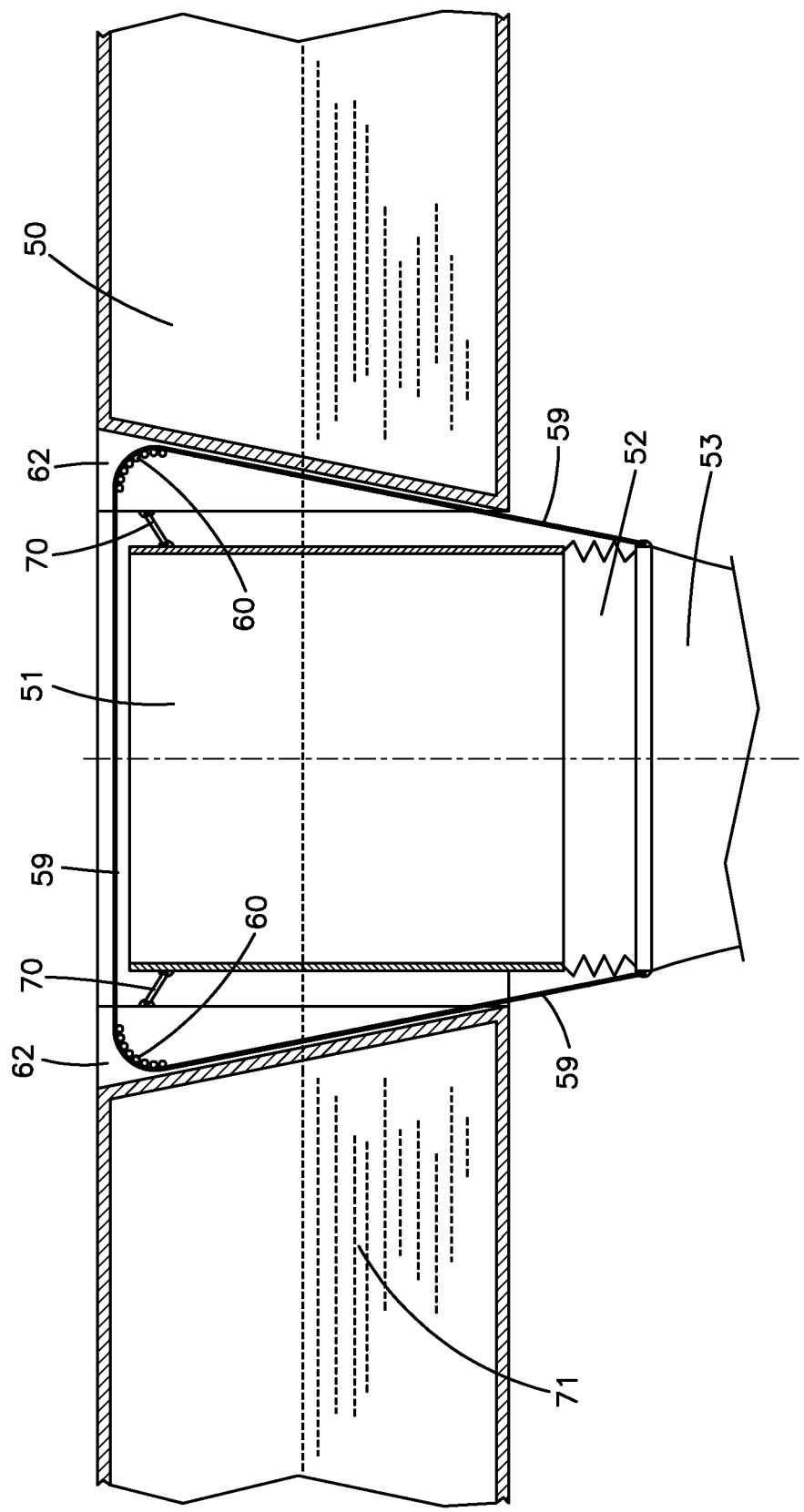
FIG. 26A shows a cold water piping system according to an embodiment of the present invention shown in FIG. 19, where
Figure 26B:
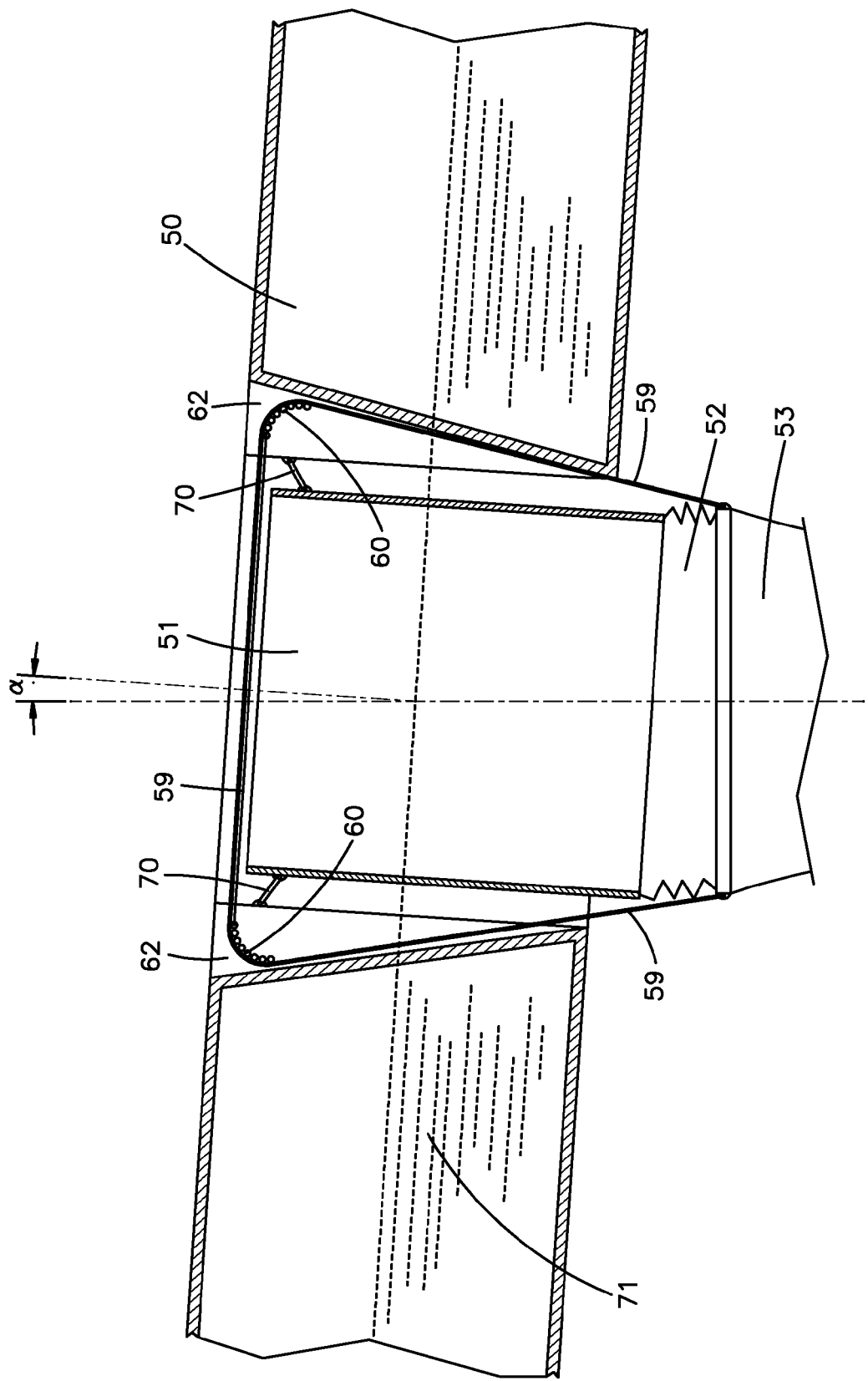
FIG. 26B shows a cold water piping system according to an embodiment of the present invention shown in FIG. 19, where

As shown in FIGS. 23, 25, 26A, and 26B, the platform includes recesses 62 in the platform 50 for receiving the suspension cable 59 and roller bearing 60 assemblies to allow such movement of the articulating interface 51. These recesses 62 are generally rectangularly shaped as shown on FIG. 23 and are disposed at preferably 12-3-6-9 o'clock positions on the platform's cylindrical opening as shown on FIG. 23 to the moon pool 58 to receive the articulating interface. As best shown in FIGS. 25, 26A, and 26B, the recesses 62 shown in a cross-sectional view have a declining interior hole diameter design starting at the top of the platform 50 and going to the bottom of the platform 50. This preferred design allows the articulating interface 51 to move in the platform 50 as described above. FIG. 25 also shows other preferred aspects of the equipment on the surface of the platform 50, namely the plurality of winches 56 and deployment cables 57.

Figure 24:
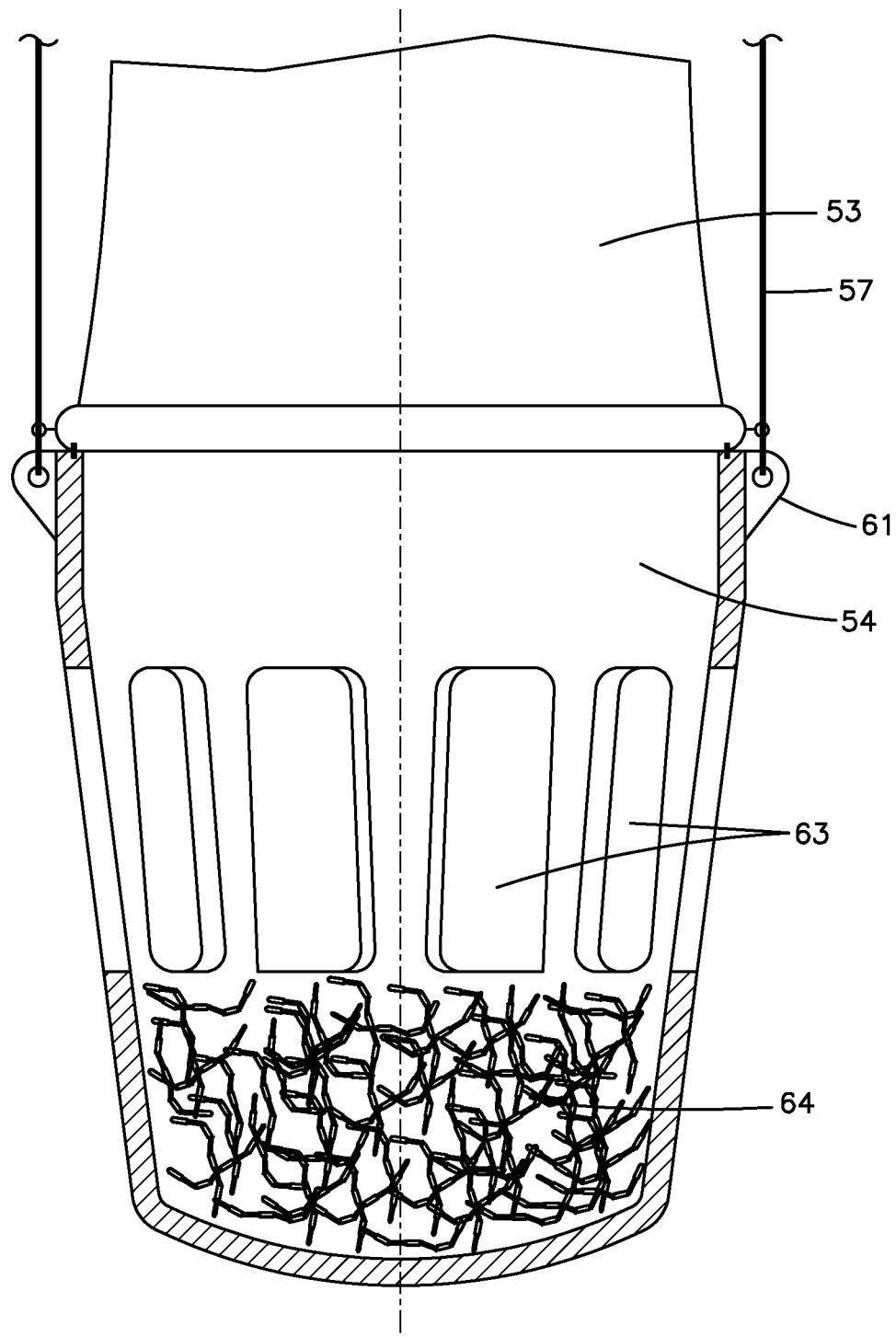
FIG. 24 shows a strainer and ballast assembly according to an embodiment of the present invention shown in FIG. 19, where

FIG. 24 shows a strainer 54 and ballast assembly according to an embodiment of the present invention shown in FIG. 19, where FIG. 24 shows a strainer 54 assembly having a plurality of holes 63 and containing a ballast 64 in chains or other known in the art ballast means for tensioning. As shown in FIGS. 23-25, the deployment cables 57 connected to the winch assemblies 56 deploy the strainer 54 at the bottom of the cold water piping system, the strainer 54 including counterweight 64 preferably in the form of heavy chains to serve as a ballast for tensioning the cold water pipe in the ocean conditions, such counterweight may include securing means to securing the counterweight to the floor of the strainer 54 as understood by a person of ordinary skill in the art. However, unlike the prior art where securing to the ocean floor is required, this embodiment does not require such securing to the ocean floor, i.e., the weight of the strainer and counterweight effectively serve to tension the cold water piping system so it is able to withstand an external pressure and remains relatively straight/perpendicular in the ocean when deployed. This preferred approach of including a strainer 54 at the bottom of the cold water piping system affords the inventors greater flexibility in using the cold water piping systems as previous systems used means to connect the bottom portion to the ocean floor, at a greater cost and degree of complexity. The strainer's connection to the lower modular element 53 is described above in this application by various connection means. In addition, the plurality of holes 64 in the strainer 54 have a preferred window-like design in the strainer walls but can include many different design including a plurality of circular holes, where each design allows only entry of seawater, such designs being understood by a person of ordinary skill in the art.

FIG. 25 shows a cold water piping system according to an embodiment of the present invention shown in FIG. 19, where FIG. 25 shows a more detailed view of the top portion of the floating platform 50, articulating tubular interface 51, vertically mounted modular elements 53, and winch 56 and cable 57 assemblies. The connection of the cold water pipe with the platform 50 (for OTEC or FLNG) will now be described with reference to FIG. 25. A connecting element between the cold water pipe and the platform 50 preferably filters or attenuates the angular motions of the platform (roll and pitch) to the cold water pipe. A plurality of suspension cables 59 and roller bearings 60 connected to the platform 50 by a chain plate or other known in the art means for making such connection, are connected to chain plate 61 at the bottom of the articulating interface. As shown in FIGS. 23 and 25, the platform 50 includes rectangular shaped recesses 62 as described above that allow the suspension cables 59 and roller bearings 60 to move in and out of the platform 50 based on weather conditions. This "swinging interface" for the articulating member 51 allows the platform 51 to move with the turbulent conditions but retains the articulating interface in one generally central location to maintain a vertical orientation for the cold water piping system. In addition, bottom portion of the articulating interface includes a bellow 52 that extends on one side (shown on the left bellow in FIG. 26B) and retracts on the other side (shown on the right side bellow in FIG. 26B) when the platform rolls and pitches based on turbulent sea conditions, the roll and pitch being quantified by a certain delta indicated above the tubular interface on FIG. 26B.

As shown in FIG. 25, with respect to the suspension cables 59, the articulating interface is preferably hung to the four ends of two suspension cables 59 situated in preferably two perpendicular planes as shown in FIG. 22, each suspension cable 59 laying on two pulleys made of multiple sheaves, can slide on them, their ends with the cold water pipe remaining standstill when the pulleys move up and down with the platform 50 motions. With respect to the bellows 53 shown in FIGS. 19 and 22, the bellows are connected to the first modular element and preferably made of a horizontally pleated cylinder, extended by a soft element in fabric, for continuity between the cold water pipe and the moon pool 58. The cylinder extension is fastened to the moon-pool 58 near the deck of the platform 50 by straps 70, the deployment cables 57 being inevitably preferably between the moon pool 58 wall and the fabric element.

Figure 27B:
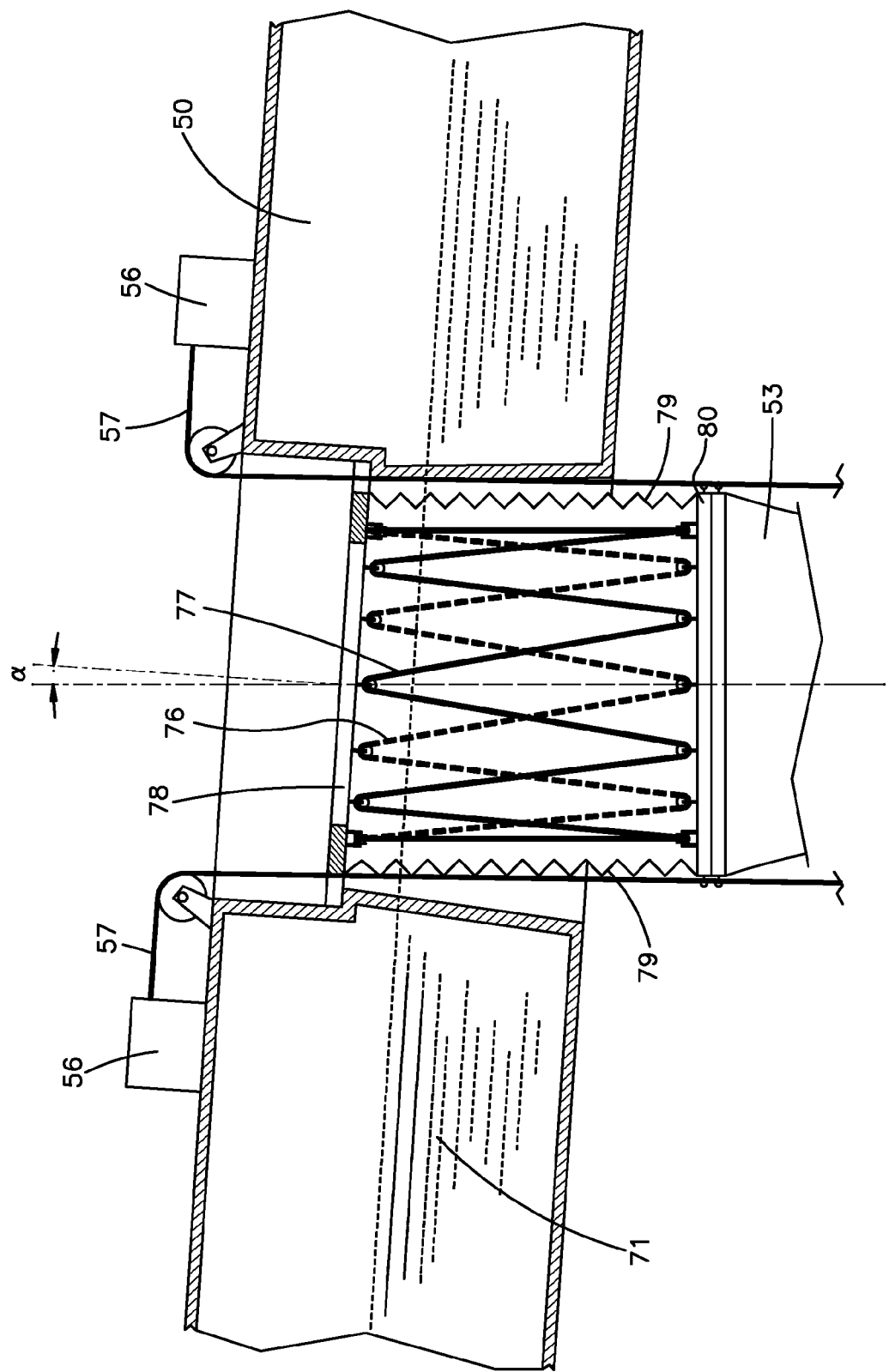
FIG. 27B shows a cold water piping system according to the embodiment shown in FIG. 27A, during turbulent seas which causes the ocean to heel, raise and lower the platform.
Figure 28:
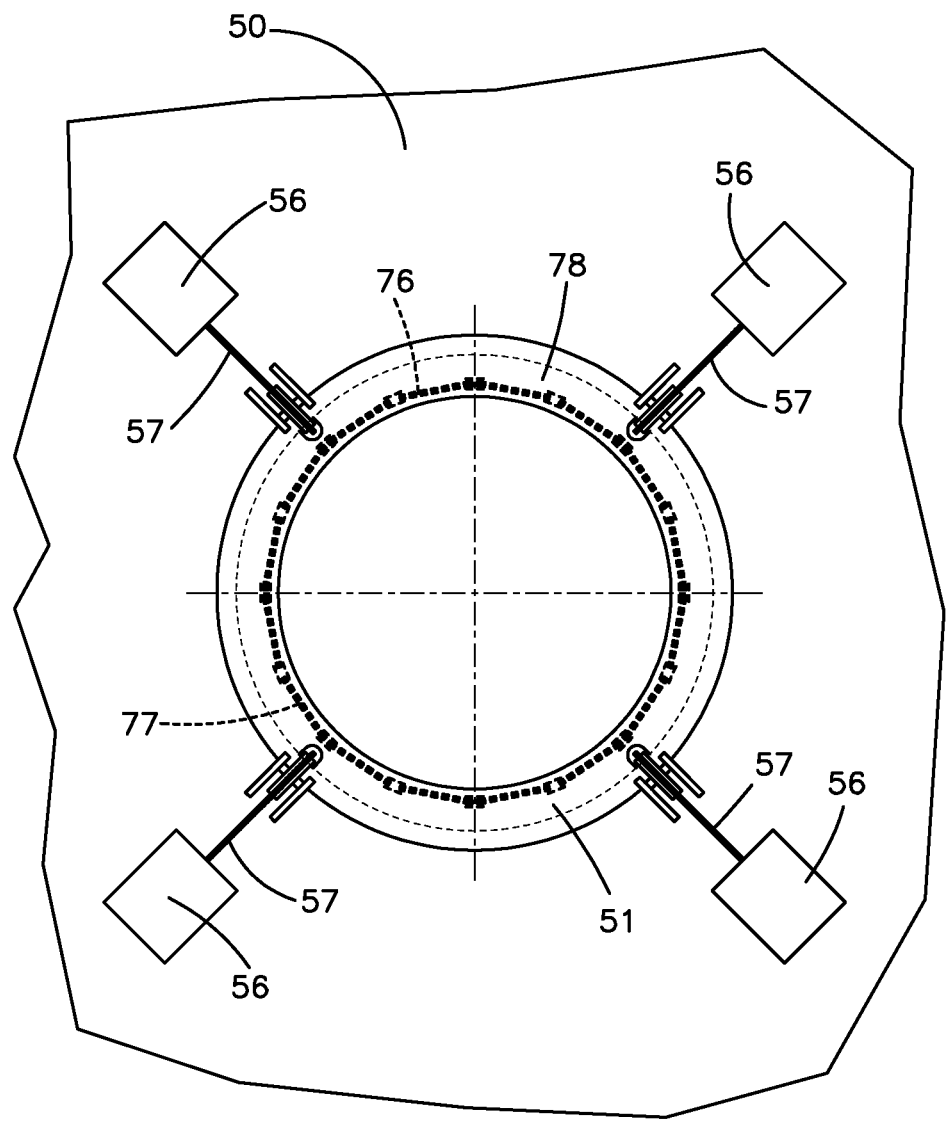
FIG. 28 shows a top view of the embodiment of the present invention shown in FIG. 27A.

FIG. 27A shows a cold water piping system according to an embodiment of the present invention, where FIG. 27A shows another embodiment of an articulating interface used in floating platform associated with OTEC and FLNG. More specifically, the articulating interface that supports the cold water piping system is hung by four ends of two suspension cables. FIG. 27A depicts a platform and articulating interface during calm seas. FIG. 27B shows a cold water piping system according to the embodiment shown in FIG. 27A, during turbulent seas which causes the ocean to raise and lower the platform. FIG. 28 shows a top view of the embodiment of the present invention shown in FIG. 27A.

As shown in FIGS. 27A, 27B, and 28, to adapt the cold water pipe connection to the platform's 50 motions, as an alternative, instead of being hung by the four ends of two suspension cables as shown above in FIGS. 22, 23, 25, 26A, and 26B, the cold water pipe, after deployment, is suspended to an apparel made of two rings 78 preferably spaced vertically a few meters apart, connected together by a continuous rope in a preferable "loop" format as shown in FIG. 27A, passing through eight or more pulleys 81 on each ring, creating 16 or more suspension strands, with the "solid" suspension strands 77 being shown in FIG. 27A as the strands closest to the viewer when viewed from the side, and the "dashed" suspension strands representing the strands farthest away from the viewer when viewed from the side. A person of ordinary skill in the art understands that the number of strands may vary and include, for example, four pulleys 81 or a number provided based on the requisite need. A bellows 79 is arranged outside the suspension strands 76, 77 for greater flexibility. The upper ring 78 is secured with the platform 50, in the moon pool 58, the lower ring 80 is fastened to the top of the first modular element 53. In turbulent ocean conditions, as shown in FIG. 27B, the slope of the platform 50 and upper ring 78 inclines, thus they are no longer horizontal and parallel to the lower ring 80, which remains still with the cold water pipe, the rope/suspension strands 76, 77 running on the pulleys 81, modify the distance between the two rings 78, 80: increased on one side (the right side as shown in FIG. 27B) and reduced on the opposite side (the left side as shown on FIG. 27B).

Although a preferred embodiment of the present invention and modifications thereof have been described in detail herein, it is to be understood that this invention is not limited to these precise embodiments and modifications, and that other modifications and variations may be effected by one skilled in the art without departing from the spirit and scope of the above-discussed embodiments of the invention. For example, the embodiments of the present invention could also be used to recover oil and/or to provide an isolated column of water in lakes.

We claim:
1. A cold water piping system comprising:
a floating platform having horizontal and vertical surfaces, the platform including a moon pool generally in the middle of the horizontal surface in the form of a vertical cylinder, the floating platform including at least four recesses having a rectangular shape;
an articulating interface suspended directly from the platform, the interface including a substantially circular tubular shape comprised of fabric materials and a bellows assembly disposed at a bottom portion of the articulating interface;
at least two suspension cable assemblies having roller bearings attached to the cable assemblies, wherein the at least two suspension cable assemblies cross the moon pool;
a plurality of vertically mounted modular elements, wherein ends of the suspension cable assemblies are fastened to a top modular element at four diametrically opposed points;
a strainer having sea water intakes and ballasting means including a counterweight connected to a lowest modular element,
a plurality of winches disposed on the horizontal surface of the platform; and a plurality of deployment cables connected to the strainer and plurality of winches, wherein sections of the at least two suspension cable assemblies and roller bearings are disposed in the at least four recesses in the floating platform.

2. The cold water piping system according to claim 1, wherein the cold water piping system is tensioned by the cold water piping system's own weight, by the strainer weight, and by the counterweight located in the strainer.

3. The cold water piping system according to claim 1, wherein the plurality of modular elements include flexible elements in the form of soft membranes clamped between at least two rings made out of steel, composite or other non-isotropic material.

4. The cold water piping system according to claim 3, wherein the soft membrane includes single-ply, two-ply, or multi-ply.

5. The cold water piping system according to claim 1, wherein an external shape of the plurality of modular elements includes a hyperboloide shape.

6. The cold water piping system according to claim 5, wherein the plurality of modular elements are under tension, able to withstand an external pressure, or an internal depressure.

7. The cold water piping system, according to claim 6, wherein the plurality of modular element includes a hyperboloid shape, has a capacity to withstand an external pressure (or internal depressure) proportional to a pipe tension.

8. The cold water piping system according to claim 1, wherein the plurality of modular elements are connected to the plurality of deployment cables fastened to the strainer.

9. The cold water piping system according to claim 1, wherein the top modular element is held up by the plurality of suspension cables which hang a cold water pipe when completely deployed, the plurality of deployment cables becoming slacken after deployment.

10. The cold water piping system according to claim 1, wherein the at least two suspension cables at their crossing in the moon pool center are slightly separated in height.

11. The cold water piping system according to claim 1, wherein the at least two suspension cables are capable of laying on two opposites pulleys, wherein the suspension cables slide on the pulleys when they move vertically with angular motions of the platform.

12. The cold water piping system according to claim 1, wherein the suspension cable assemblies are disposed in at least four vertical cases located around the moon pool at 90 degrees.

13. The cold water piping system according to claim 10, wherein the plurality of deployment cables and winches are disposed between at least four vertical cases.

14. The cold water piping system according to claim 1, wherein the vertical displacement of the bellows assembly could be placed and fixed in the moon pool above the water surface.

15. The cold water piping system according to claim 1, wherein the plurality of deployment cables do not interfere with the bellows assembly.

16. The cold water piping system according to claim 1, wherein the bellows assembly include an approximate length of 20 percent of the total length of the articulating interface.

17. The cold water piping system according to claim 1, wherein the at least two suspension cables are connected to a top of a first modular element by connection means including art chain plate assemblies.

18. The cold water piping system according to claim 1, wherein the at least two suspension cables are secured to the platform by connection means including rollers and chain plate assemblies.

19. The cold water piping system according to claim 16, wherein cables roll on roller bearings, wherein after the roller bearings are secured to the floating platform with a chain plate or similar securing means, then the articulating interface is capable of swinging in multiple directions.

20. A cold water piping system comprising:
a floating platform having horizontal and vertical surfaces, the platform including a moon pool generally in the middle of the horizontal surface in the form of a vertical cylinder with at least four recesses having a rectangular shape;
an articulating interface suspended directly from the platform, the articulating interface including a substantially circular tubular shape and a bellows disposed at a bottom portion of the articulating interface;
at least two suspension cable assemblies secured to the platform connected to a top of the articulating interface, wherein the at least two suspension cable assemblies cross the moon pool;
a plurality of vertically mounted modular elements, wherein ends of the suspension cable assemblies are fastened to a top modular element at four diametrically opposed points;
a strainer having sea water intakes and ballasting means including a counterweight connected to a lowest modular element;
a plurality of winches disposed on the horizontal surface of the platform; and
a plurality of deployment cables connected to the strainer and plurality of winches;
wherein the at least two suspension cable assemblies and roller bearings connected to the platform and bottom of the articulating interface by connection means include a chain plate;
wherein, with respect to the bellows connected to a first modular element, the bellows is made of a horizontally pleated cylinder, extended by a soft element in fabric, for the continuity between a cold water pipe and the moon pool, a cylinder extension is fastened to the moon pool near the platform by straps, the deployment cables being between a moon pool wall and a fabric element, and
wherein sections of the at least two suspension cable assemblies and roller bearings are disposed in the at least four recesses in the floating platform.

21. A cold water piping system comprising:
a floating platform having horizontal and vertical surfaces;
an articulating interface suspended directly from the floating platform, the articulating interface including a substantially circular tubular shape, an apparel made of two rings spaced vertically a few meters apart, connected together by suspension strands in a loop format, passing through pulleys on each ring, having a bellows arranged outside the suspension strands, an upper ring being secured with the floating platform within the moon pool,
wherein a lower ring is fastened to a top of the first modular element,
at least two suspension cable assemblies connected to a top of the articulating interface, wherein the articulating interface is hung by four ends of the at least two suspension cable assemblies;
a plurality of vertically mounted modular elements, wherein ends of the suspension cable assemblies are fastened to a top modular element;

a strainer having sea water intakes and ballasting means including a counterweight connected to a lowest modular element;
a plurality of winches disposed on the horizontal surface of the floating platform; and
a plurality of deployment cables connected to the strainer and plurality of winches, wherein the lower ring is fastened to the top of the first modular element.

22. The cold water piping system according to claim 21, wherein, in turbulent conditions, a slope of the floating platform and the upper ring inclines, wherein the lower ring remains still with a cold water pipe.

\* \* \* \* \*